US010782497B2

(12) United States Patent
Solheid et al.

(10) Patent No.: US 10,782,497 B2
(45) Date of Patent: Sep. 22, 2020

(54) TELECOMMUNICATIONS CONNECTION CABINET

(71) Applicant: CommScope Technologies LLC, Hickory, NC (US)

(72) Inventors: James J. Solheid, Lakeville, MN (US); Daniel Ray Mertesdorf, Tehachapi, CA (US); Matthew Holmberg, Le Center, MN (US); Trevor D. Smith, Eden Prairie, MN (US); Joel B. Douglas, Newton, IA (US); Kathleen M. Barnes, Santa Rosa, CA (US); Marlon E. Holmquist, St. Peter, MN (US); Thomas Caesar Tinucci, Chaska, MN (US); Cindy S. Walters, Prior Lake, MN (US); James W. Conroy, Prior Lake, MN (US)

(73) Assignee: CommScope Technologies LLC, Hickory, NC (US)

( * ) Notice: Subject to any disclaimer, the term of this patent is extended or adjusted under 35 U.S.C. 154(b) by 49 days.

(21) Appl. No.: 16/117,524

(22) Filed: Aug. 30, 2018

(65) Prior Publication Data

US 2019/0064461 A1 Feb. 28, 2019

Related U.S. Application Data

(63) Continuation of application No. 15/365,226, filed on Nov. 30, 2016, now Pat. No. 10,151,896, which is a
(Continued)

(51) Int. Cl.
*G02B 6/38* (2006.01)
*G02B 6/44* (2006.01)
*G02B 6/46* (2006.01)

(52) U.S. Cl.
CPC .......... *G02B 6/445* (2013.01); *G02B 6/3849* (2013.01); *G02B 6/3879* (2013.01); (Continued)

(58) Field of Classification Search
CPC .. G02B 6/3849; G02B 6/3879; G02B 6/3893; G02B 6/445
See application file for complete search history.

(56) References Cited

U.S. PATENT DOCUMENTS 4,736,100 A 4/1988 Vastagh
4,747,020 A 5/1988 Brickley et al.
(Continued)

FOREIGN PATENT DOCUMENTS

CN 2426610 Y 4/2001
CN 2625920 Y 7/2004
(Continued)

OTHER PUBLICATIONS

Certified English Translation of JP2000-193833 by David Baldwin of Park IP Translations (26 pages).
(Continued)

*Primary Examiner* — Sung H Pak
*Assistant Examiner* — Hoang Q Tran
(74) *Attorney, Agent, or Firm* — Merchant & Gould P.C.

(57) ABSTRACT

A telecommunications cabinet includes a cabinet housing; a fiber optic splitter; a plurality of spools disposed on a cable management surface; a panel oriented at a fixed angle relative to the access opening so that the panel extends laterally and rearwardly between the access opening and the cable management surface; and a plurality of adapters disposed on the panel.

33 Claims, 17 Drawing Sheets

Related U.S. Application Data continuation of application No. 14/981,322, filed on Dec. 28, 2015, now Pat. No. 9,541,724, which is a continuation of application No. 14/814,047, filed on Jul. 30, 2015, now Pat. No. 9,250,408, which is a continuation of application No. 14/341,938, filed on Jul. 28, 2014, now Pat. No. 9,304,276, which is a continuation of application No. 13/768,378, filed on Feb. 15, 2013, now Pat. No. 8,811,791, which is a continuation of application No. 13/176,577, filed on Jul. 5, 2011, now Pat. No. 8,401,357, which is a continuation of application No. 12/908,238, filed on Oct. 20, 2010, now Pat. No. 7,995,894, which is a continuation of application No. 12/276,886, filed on Nov. 24, 2008, now Pat. No. 7,844,159, which is a continuation of application No. 11/729,310, filed on Mar. 27, 2007, now Pat. No. 7,457,503, which is a continuation of application No. 10/613,764, filed on Jul. 2, 2003, now Pat. No. 7,233,731.

(52) U.S. Cl.
CPC ......... *G02B 6/3893* (2013.01); *G02B 6/3897* (2013.01); *G02B 6/4442* (2013.01); *G02B 6/4446* (2013.01); *G02B 6/4452* (2013.01); *G02B 6/4457* (2013.01); *G02B 6/4471* (2013.01); *G02B 6/4478* (2013.01); *G02B 6/46* (2013.01); *H04Q 2201/804* (2013.01); *Y10T 29/49826* (2015.01)

(56) References Cited

U.S. PATENT DOCUMENTS

| | | |
|---|---|---|
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,948,220 A | 8/1990 | Violo et al. |
| 4,977,483 A | 12/1990 | Perretta |
| 4,995,688 A | 2/1991 | Anton et al. |
| 4,999,652 A | 3/1991 | Chan |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,778,130 A | 7/1998 | Walters et al. |
| 5,778,132 A | 7/1998 | Csipkes et al. |
| 5,784,515 A | 7/1998 | Tamaru et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A | 6/2000 | Roth |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| 6,298,190 B2 | 10/2001 | Waldron et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 * | 7/2002 | Puetz ............... H04Q 1/068 385/135 |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleirner et al. |
| 6,483,977 B2 | 11/2002 | Battey et al. |
| 6,496,640 B1 | 12/2002 | Harvey et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,755,574 B2 | 6/2004 | Fujiwara |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,792,190 B2 | 9/2004 | Xin |
| 6,792,191 B1 | 9/2004 | Clapp, Jr. et al. |

(56) References Cited

U.S. PATENT DOCUMENTS

| | | | |
|---|---|---|---|
| 6,815,612 B2 | 11/2004 | Bloodworth et al. | |
| 6,850,685 B2* | 2/2005 | Tinucci | G02B 6/4455 |
| | | | 385/134 |
| 6,853,795 B2 | 2/2005 | Dagley et al. | |
| 6,870,734 B2 | 3/2005 | Mertesdorf et al. | |
| 6,901,200 B2 | 5/2005 | Schray | |
| 6,909,833 B2 | 6/2005 | Henschel et al. | |
| 6,920,274 B2 | 7/2005 | Rapp et al. | |
| 6,925,241 B2 | 8/2005 | Bohle et al. | |
| 6,950,593 B2 | 9/2005 | Hodge et al. | |
| 6,980,725 B1 | 12/2005 | Swieconek | |
| 6,983,095 B2 | 1/2006 | Reagan et al. | |
| 7,029,322 B2 | 4/2006 | Ernst et al. | |
| 7,088,899 B2 | 8/2006 | Reagan et al. | |
| 7,142,764 B2 | 11/2006 | Allen et al. | |
| 7,198,409 B2 | 4/2007 | Smith et al. | |
| 7,200,317 B2 | 4/2007 | Reagan et al. | |
| 7,218,827 B2 | 5/2007 | Vongseng et al. | |
| 7,233,731 B2 | 6/2007 | Solheid et al. | |
| 7,277,620 B2 | 10/2007 | Vongseng et al. | |
| 7,407,330 B2 | 8/2008 | Smith et al. | |
| 7,457,503 B2 | 11/2008 | Solheid et al. | |
| 7,515,805 B2 | 4/2009 | Smith et al. | |
| 7,519,259 B2 | 4/2009 | Smith et al. | |
| 7,809,233 B2 | 10/2010 | Smith et al. | |
| 7,809,234 B2 | 10/2010 | Smith et al. | |
| 7,826,706 B2 | 11/2010 | Vongseng et al. | |
| 7,841,775 B2 | 11/2010 | Smith et al. | |
| 7,844,159 B2 | 11/2010 | Solheid et al. | |
| 7,980,768 B2 | 7/2011 | Smith et al. | |
| 7,995,894 B2 | 8/2011 | Solheid et al. | |
| 8,184,940 B2 | 5/2012 | Smith et al. | |
| 8,210,756 B2 | 7/2012 | Smith et al. | |
| 8,401,357 B2 | 3/2013 | Solheid et al. | |
| 8,538,228 B2 | 9/2013 | Smith et al. | |
| 8,636,421 B2 | 1/2014 | Smith et al. | |
| 8,811,791 B2 | 8/2014 | Solheid et al. | |
| 8,818,158 B2 | 8/2014 | Smith et al. | |
| 9,122,019 B2 | 9/2015 | Smith et al. | |
| 9,201,206 B2 | 12/2015 | Smith et al. | |
| 9,250,408 B2 | 2/2016 | Solheid et al. | |
| 9,304,276 B2 | 4/2016 | Solheid et al. | |
| 9,341,798 B2 | 5/2016 | Smith et al. | |
| 9,470,851 B2 | 10/2016 | Smith et al. | |
| 9,541,724 B2 | 1/2017 | Solheid et al. | |
| 9,784,928 B2 | 10/2017 | Smith et al. | |
| 2001/0001270 A1 | 5/2001 | Williams Vigliaturo | |
| 2001/0048790 A1* | 12/2001 | Burkholder | G02B 6/3825 |
| | | | 385/78 |
| 2002/0034290 A1 | 3/2002 | Pershan | |
| 2002/0176681 A1 | 11/2002 | Puetz et al. | |
| 2002/0181893 A1 | 12/2002 | White et al. | |
| 2003/0002812 A1 | 1/2003 | Lampert | |
| 2003/0113086 A1 | 6/2003 | Jun et al. | |
| 2003/0174996 A1 | 9/2003 | Henschel et al. | |
| 2003/0207601 A1 | 11/2003 | Adachi | |
| 2004/0074852 A1 | 4/2004 | Knudsen et al. | |
| 2004/0126069 A1 | 7/2004 | Jong et al. | |
| 2004/0165852 A1 | 8/2004 | Erwin et al. | |
| 2004/0228598 A1 | 11/2004 | Allen et al. | |
| 2004/0264873 A1 | 12/2004 | Smith et al. | |
| 2005/0002633 A1 | 1/2005 | Solheid et al. | |
| 2005/0129379 A1 | 6/2005 | Reagan et al. | |
| 2005/0163448 A1 | 7/2005 | Blackwell, Jr. | |
| 2005/0281526 A1 | 12/2005 | Vongseng et al. | |
| 2006/0083475 A1 | 4/2006 | Grubish et al. | |
| 2006/0115220 A1 | 6/2006 | Elkins, II et al. | |
| 2006/0204200 A1 | 9/2006 | Lampert et al. | |
| 2008/0025684 A1 | 1/2008 | Vongseng et al. | |
| 2009/0074372 A1 | 3/2009 | Solheid et al. | |
| 2009/0087157 A1 | 4/2009 | Smith et al. | |
| 2009/0317047 A1 | 12/2009 | Smith et al. | |

FOREIGN PATENT DOCUMENTS

| | | |
|---|---|---|
| EP | 0 743 701 A2 | 11/1996 |
| EP | 0 788 002 A1 | 8/1997 |
| EP | 0 871 047 A1 | 10/1998 |
| EP | 0 975 180 A1 | 1/2000 |
| EP | 1 045 267 A1 | 10/2000 |
| JP | 63-229409 A | 9/1988 |
| JP | 2000075180 A | 3/2000 |
| JP | 2000-193833 A | 7/2000 |
| JP | 2000-241629 A | 9/2000 |
| JP | 2001027720 A | 1/2001 |
| JP | 2001-133634 A | 5/2001 |
| JP | 2001235633 A | 8/2001 |
| JP | 1144266 S | 6/2002 |
| JP | 3307618 B2 | 7/2002 |
| JP | 2005091379 | 4/2005 |
| JP | 3698579 B2 | 9/2005 |
| JP | 3761762 B2 | 3/2006 |
| JP | 2007-121609 A | 5/2007 |
| WO | WO 98/53347 A2 | 11/1998 |
| WO | WO 99/27404 A1 | 6/1999 |
| WO | WO 00/75706 A2 | 12/2000 |
| WO | WO 02/21182 A1 | 3/2002 |
| WO | WO 02/103429 A2 | 12/2002 |
| WO | WO 2004/032532 A2 | 4/2004 |

OTHER PUBLICATIONS

Certified English Translation of JP2000-193833 by Frank McGee of Morningside IP (24 pages).

Certified English Translation of JP2000-241629 by Frank McGee of Morningside IP (33 pages).

Certified English Translation of JP2000-241629 by Jonathan Merz (36 pages).

European Search Report dated Jul. 4, 2011.

Drawings showing an ADC fiber storage trough concept including presentation entitled "Fujitsu Fiber Management Project Fiber Trough Concept", 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

"Retainer Staright [sic] Removable SC," which shows a latch design, 2 pages (Jan. 17, 2006).

Brochure from Amphenol Corp. entitled "Amphenol® 954 Series one piece SC Connector," 2 pgs. (1990).

AMP Inc. catalog entitled "Fiber Optic Products," front and back covers and p. 59, (4 pgs.) (© 1991).

HRS catalog entitled "Optical Fibre Connectors," front and back covers and pp. 16, 17 and 49 (5 pages) (Mar. 1991).

AT&T Network Systems catalog entitled "Fiber Optic Products Innovation for wide ranging applications," front and back covers and pp. 6-1 through 6-16 (18 pages) (© 1995).

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX™ 600, Optical Distribution Frame Brochure; front cover, Table of Contents, pp. 1-14, and back cover; revised Feb. 2001, Item No. 854.

Iwano, S. et al., "MU-type Optical Fiber Connector System," *NTT Review*, vol. 9, No. 2, pp. 63-71 (Mar. 1997).

NTT Int'l Fiber Termination Module (FTM) & Premises Optical Distribution Cabinets (PODC) product brochure, 3 pages, undated.

(56) References Cited

OTHER PUBLICATIONS

Sugita, E. et al., "SC-Type Single-Mode Optical Fiber Connectors," *Journal of Lightwave Technology*, vol. 7, No. 11, pp. 1689-1696 (Nov. 1989).
24 photos of LambdaUnite® Blank Card; "LambdaUnite® MultiService Switch (MSS)" brochure (2003); and "Lucent's LambdaUnite® Busts Out" official release (Jan. 29, 2002).
Complaint relating to Civil Action No. 08-CV-5222-RMK-JJK, filed Sep. 19, 2008 (8 pages).
First Amended Complaint relating to ADC Telecommunications, Inc. v. Tyco Electronics Corp., Civil Action No. 08-CV-05222, filed Dec. 8, 2008.
Answer, Affirmative Defenses, and Counter Claims to the First Amended Complaint relating to ADC Telecommunications, Inc. v. Tyco Electronics Corp., Civil Action No. 08-CV-05222, filed Mar. 13, 2009.
ADC's Reply to Counterclaims and Counterclaims relating to ADC Telecommunications, Inc. v. Tyco Electronics Corp., Civil Action No. 08-CV-05222, filed Apr. 2, 2009.
Stipulated Dismissal of all Claims and Counterclaims relating to ADC Telecommunications, Inc. v. Tyco Electronics Corp., Civil Action No. 08-CV-05222, filed Oct. 30, 2009.
20 photographs showing what AFL Telecommunications LLC purports to be the ECOE cabinet referenced in the Prior art statement and the Supplemental prior art statement listed above. AFL Telecommunications LLC asserts the cabinet shown in the photographs was on sale as early as 2001.
Complaint relating to Civil Action No. 08-CV-02234-DWF-JSM, filed Jun. 13, 2008.
First Amended Complaint, ADC Telecommunication, Inc. and Fiber Optic Network Solutions Corp. v. AFL Telecommunications LLC, Civil Action No. 0:08-cv-02234-DWF-JSM, 8 pages (Aug. 14, 2008).
Defendant's Answer and Defenses in Response to the First Amended Complaint, ADC Telecommunication, Inc. and Fiber Optic Network Solutions Corp. v. AFL Telecommunications LLC, Civil Action No. 0:08-cv-02234-DWF-JSM, 14 pages (Dec. 8, 2008).
Amended Order for Pretrial Conference, ADC Telecommunication, Inc. and Fiber Optic Network Solutions Corp. v. AFL Telecommunications LLC, Civil Action No. 0:08-cv-02234-DWF-JSM, 5 pages (Dec. 11, 2008).
Prior art statement submitted by AFL Telecommunications LLC in Civil Action No. 08-CV-02234-DWF-JSM on May 11, 2009 (145 pages).
Supplemental prior art statement submitted by AFL Telecommunications LLC in Civil Action No. 08-CV-02234-DWF-JSM on May 19, 2009 (155 pages).
Response to prior art statement submitted by ADC Telecommunications, Inc. in Civil Action No. 08-CV-02234-DWF-JSM on Aug. 18, 2009 (131 pages).
Second supplemental prior art statement submitted by AFL Telecommunications LLC in Civil Action No. 08-CV-02234-DWF-JSM on Nov. 10, 2009 (8 pages).
Joint Claim Construction Statement, relating to Civil Action No. 08-CV-02234, filed Nov. 17, 2009 (40 pages).
Plaintiff ADC's Markman Brief (Redacted Version), filed Feb. 9, 2010, relating to Civil Action No. 08-CV-02234-DWF-JSM (99 pages).
Defendant AFL Telecommunications LLC's Memorandum in Support of Proposed Claim Construction, (AFL's Markman Brief), filed Feb. 9, 2010, relating to Civil Action No. 08-CV-02234 (42 pages).
Plaintiff ADC's Responsive Markman Brief, filed Mar. 9, 2010, relating to Civil Action No. 08-CV-02234 (21 pages).
Defendant AFL Telecommunications LLC's Answering Claim Construction Brief, filed Mar. 9, 2010, relating to ADC Telecommunications, Inc. v. AFL Telecommunications LLC, Civil Action No. 08-CV-02234 (60).
Stipulated Dismissal of all Claims and Counterclaims relating to ADC Telecommunications, Inc. v. AFL Telecommunications LLC, Civil Action No. 08-CV-02234, filed Jul. 27, 2010 (2 pages).
Dismissal Order relating to ADC Telecommunications, Inc. v. AFL Telecommunications LLC, Civil Action No. 08-CV-02234, filed Jul. 28, 2010 (1 page).
FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005) (shows the same device as shown in FONS Corporation's MDC Series Rack or Wall Mount Enclosures product sheet (above)).
FONS Corporation's Technical Drawing No. 11669, Rev. D, of Distribution Cabinet Assembly MFDC-7, 1 page (technical drawing depicting the device shown in FONS Corporation's Modular Distribution Cabinets Rack Mount Enclosures (above)).
ADC Telecommunications, Inc.'s Secure Fiber Entrance Terminal (SFET) Brochure; front cover, pp. 2-7, and back cover; revised May 1998, Item No. 1005.
ADC Telecommunications, Inc.'s $2^{nd}$ Edition of Fiber Panel Products; front cover, Table of Contents, pp. 1-111, and back cover; revised Jul. 1996, Item No. 846.
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).
Optical fiber coupler review, Technical Report 2001, showing Sumitomo Osaka Cement Co. Ltd's Optical Coupler (pp. 41-42).
Hasegawa et al., *100GHz-48CH Athermal AWG with a Novel Temperature Insensitive Principle*, National Fiber Optics Engineers Conference, 2003 Technical Proceedings, pp. 801-808.
ATI Optique Catalog, ATI Optique Division of TI electronique, Version 2.6, released Mar. 27, 2002 (50 pages).
Tachikura et al., *Newly Developed Optical Fiber Distribution System and Cable Management in Central Office*, International Wire & Cable Symposium, Proceedings of the $50^{th}$ IWCS, pp. 98-105.
*Couplers: Couplers WDMS Packaging*, Alcoa Fujikura Ltd., Telecommunications Division, © 2000 (5 pages) showing AFL splitters.
Office Action and Certified translation thereof cited by Japanese Patent Examiner in Japanese application No. 2006-517505, which is equivalent to copending and coassigned U.S. Appl. No. 12/276,886, filed Nov. 24, 2008, by Smith et al., titled "Telecommunications Connection Cabinet."
European Search Report dated Nov. 19, 2009 for European Application No. 09011819, which claims priority to previously cited U.S. Pat. No. 7,198,409 (7 pages).
Technical Specifications, Seiko Instruments Inc., SSC-PE Series Single-Mode SC Connector Plug: (published in 2000).
"Senko Advanced Components: SC Connector Kits," printout from website of Senko Advanced Components at www.senko.com/fiberoptic/detail_product.php?product=80 available at least as early as Mar. 26, 2003 (obtained Nov. 7, 2017 via Internet Archive Wayback Machine).
Complaint—CommScope Technologies LLC v. Clearfield, Inc., Case No. 17-cv-00307 (D. Minn., Jan. 2017).
Exhibit A to Complaint—CommScope Technologies LLC v. Clearfield, Inc., Case No. 17-cv-00307 (D. Minn., Jan. 2017).
Exhibit B to Complaint—CommScope Technologies LLC v. Clearfield, Inc., Case No. 17-cv-00307 (D. Minn., Jan. 31, 2017).
Exhibit C to Complaint—CommScope Technologies LLC v. Clearfield, Inc., Case No. 17-cv-00307 (D. Minn., Jan. 31, 2017).
Exhibit D to Complaint—CommScope Technologies LLC v. Clearfield, Inc., Case No. 17-cv-00307 (D. Minn., Jan. 31, 2017).
Exhibit E to Complaint—CommScope Technologies LLC v. Clearfield, Inc., Case No. 17-cv-00307 (D. Minn., Jan. 31, 2017).
Answer to Complaint—CommScope Technologies LLC v. Clearfield, Inc., Case No. 17-cv-00307 (D. Minn., Apr. 24, 2017).
Preliminary Invalidity Claim Charts and Disclosures—CommScope Technologies LLC v. Clearfield, Inc., Case No. 17-cv-00307 (D. Minn., Oct. 6, 2017).
Exhibit 1 to Preliminary Invalidity Claim Charts and Disclosures—CommScope Technologies LLC v. Clearfield, Inc., Case No. 17-cv-00307 (D. Minn., Oct. 6, 2017).
Exhibit 2 to Preliminary Invalidity Claim Charts and Disclosures—CommScope Technologies LLC V. Clearfield, Inc., Case No. 17-cv-00307 (D. Minn., Oct. 6, 2017).

(56) References Cited

OTHER PUBLICATIONS

Exhibit 3 to Preliminary Invalidity Claim Charts and Disclosures—CommScope Technologies LLC v. Clearfield, Inc., Case No. 17-cv-00307 (D. Minn., Oct. 6, 2017).
Exhibit 4 to Preliminary Invalidity Claim Charts and Disclosures—CommScope Technologies LLC v. Clearfield, Inc., Case No. 17-cv-00307 (D. Minn., Oct. 6, 2017).
Exhibit 5 to Preliminary Invalidity Claim Charts and Disclosures—CommScope Technologies LLC v. Clearfield, Inc., Case No. 17-cv-00307 (D. Minn., Oct. 6, 2017).
Exhibit 6 to Preliminary Invalidity Claim Charts and Disclosures—CommScope Technologies LLC v. Clearfield, Inc., Case No. 17-cv-00307 (D. Minn., Oct. 6, 2017).
Assembly reference drawings having drawing No. 1067101, dated Aug. 17, 1999.
Connectorized splitter drawings having drawing No. 1067961, dated Aug. 18, 1999.
Fifth Preliminary Amendment filed Jun. 19, 2008 and Notice of Allowance dated Jul. 17, 2017 for U.S. Appl.No. 11/729,310.
European Search Report and written opinion cited in Application No. 10158615.4 dated Oct. 4, 2010.
European Search Report for Application No. 10158615.4 dated Jun. 9, 2010.
European Search Report for Application No. 10181631.2 dated Sep. 5, 2011.
Fiber distribution drawings having drawing No. 1069967, dated Aug. 17, 1999.
Installation drawings having drawing No. 1069965, dated Aug. 14, 1999.
Notice of Allowance dated May 3, 2010 for U.S. Appl. No. 12/276,886.
Order for Dismissal with Prejudice, ADC Telecommunication, Inc. and Fiber Optic Network Solutions Corp. v. AFL Telecommunications LLC, Civil Action No. 0:08-cv-02234-DWF-JSM, 1 page (Aug. 6, 2010).
Initial Claim Charts—CommScope Technologies LLC v. Clearfield, Inc., Case No. 17-cv-00307 (D. Minn., Jul. 31, 2017).
Plaintiff's Response to First Set of Interrogatories (Nos. 1-15)—CommScope Technologies LLC v. Clearfield, Inc., Case No. 17-cv-00307 (D. Minn., Sep. 14, 2017).
Plaintiff's Supplemental Response to Interrogatory No. 2—CommScope Technologies LLC v. Clearfield, Inc., Case No. 17-cv-00307 (D. Minn, Sep. 22, 2017).
Plaintiff's Memorandum in Support of Motion to Compel—CommScope Technologies LLC v. Clearfield, Inc., Case No. 17-cv-00307 (D. Minn., Oct. 9, 2017).
Petition for Inter Partes Review of U.S. Pat. No. 7,198,409—Case No. IPR2018-00003 (dated Oct. 6, 2017).
IPR2018-00003 Petition Exhibit 1003—Declaration of Michael Lebby, Ph.D., in Support of Petition for Inter Partes Review of U.S. Pat. No. 7,198,409 (dated Oct. 6, 2017).
IPR2018-00003 Petition Exhibit 1006—"SSC-PE Series Single-Mode SC Connector Plugs: Technical Specifications," Seiko Instruments, Inc. © 2002.
IPR2018-00003 Petition Exhibit 1008—"JIS C 5973: F04 Type connectors for optical fiber cables," Japanese Standards Association, 1998
IPR2018-00003 Petition Exhibit 1009—"Senko Advanced Components: SC Connector Kits," printout from website of Senko Advanced Components at www.senko.com/fiberoptic/detail_product.php?product=80 available at least as early as Mar. 26, 2003 (obtained Nov. 7, 2017 via Internet Archive Wayback Machine).
IPR2018-00003 Petition Exhibit 1010—"Corning Cable Systems UniCam™ SC/ST-Compatible/FC Connector Assembly Instructions Using FBC-006 Cleaver," Corning Cable Systems, Inc., (May 2001).
Preliminary Response by Patent Owner Under 37 C.F.R. § 42.107, Paper No. 5, Case No. IPR2018-00003, 77 pages (Jan. 12, 2018).
Exhibit 2001 to Paper No. 5—Declaration of Casirner Decusatis in Support of Patent Owner's Preliminary Response, Case No. IPR2018-00003, 50 pages (Jan. 11, 2018).
Exhibit 2002 to Paper No. 5—True and correct information downloaded from the website https://www.commscope.com/catalog/solution_wn_centralofc_hdfullfrontodf/2147496441/pdf/part/63205/CS6174-000_FIST-GR3-R-300_300-22-2.pdf on Jan. 5, 2018.
Exhibit 2003 to Paper No. 5—True and correct information downloaded from the website http://wbtnetworks.com.au/product/high-density-optical-distribution-frame-00-series/ on Jan. 5, 2018.
Exhibit 2004 to Paper No. 5—True and correct information downloaded from the website https://www.seeclearfield.com/products/category/frames/fxhd-frames.html on Jan. 5, 2018.
Exhibit 2005 to Paper No. 5—True and correct information downloaded from the website http://www.lxtelecom.com/fiber-optics/optical-fiber-distribution-frames/hd-odf-gpx82-5.html on Jan. 5, 2018.
Petition for Inter Partes Review of U.S. Pat. No. 7,809,233—Case No. IPR2018-00154 (dated Nov. 7, 2017).
Exhibit 1001 to IPR IPR2018-00154—U.S. Pat. No. 7,809,233 ("The '233 Patent").
Exhibit 1002 to IPR IPR2018-00154—Prosecution History of the '233 Patent ("The Prosecution History").
Exhibit 1003 to IPR IPR2018-00154—Declaration of Dr. Michael Lebby.
Exhibit 1004 to IPR IPR2018-00154—JP 2000-193833A to Oda et al. ("Oda") with certified translation.
Exhibit 1005 to IPR IPR2018-00154—JP 2000-241629A to Hirao et al. ("Hirao") with certified translation.
Exhibit 1006 to IPR IPR2018-00154—U.S. Pat. No. 6,983,095 to Reagan et al. ("Reagan").
Exhibit 1007 to IPR IPR2018-00154—U.S. Pat. No. 6,256,443 to Uruno et al. ("Uruno").
Exhibit 1008 to IPR IPR2018-00154—Excerpt from CommScope's Initial Claim Charts (Exhibit C) served Jul. 31, 2017, in CommScope Technologies LLC v. Clearfield, Inc.,Case No. 0:12-cv-00307-PJS-BRT (D. Minn.).
Exhibit 1009 to IPR IPR2018-00154—"SSC-PE Series Single-Mode SC Connector Plugs: Technical Specifications," Seiko Instruments, Inc., copyright 2002 ("Seiko Specification").
Exhibit 1010 to IPR IPR2018-00154—"JIS C 5973: F04 Type connectors for optical fiber cables," Japanese Standards Association, 1998 ("JLS C 5973 Standard").
Exhibit 1011 to IPR IPR2018-00154—"Senko Advanced Components: SC Connector Kits," printout from website of Senko Advanced Components at www.senko.com/fiberoptic/detail_product.php?product=80 available at least as early as Mar. 26, 2003 (obtained Oct. 5, 2017 via Internet Archive Wayback Machine) ("Senko Data Sheet").
Exhibit 1012 to IPR IPR2018-00154—"Corning Cable Systems UniCam™ SC/ST-Compatible/FC Connector Assembly Instructions Using FBC-006 Cleaver," Corning Cable Systems, Inc., May 2001 ("Corning Data Sheet").
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 1 to Second Revised Preliminary Invalidity Claim Charts and Disclosures, Civil Action No. 17-cv-00307-PJS-BRT, 61 pages (Jan. 12, 2018).
Exhibit 2 to Second Revised Preliminary Invalidity Claim Charts and Disclosures, Civil Action No. 17-cv-00307-PJS-BRT, 65 pages (Jan. 12, 2018).
Exhibit 3 to Second Revised Preliminary Invalidity Claim Charts and Disclosures, Civil Action No. 17-cv-00307-PJS-BRT, 50 pages (Jan. 12, 2018).
Exhibit 4 to Second Revised Preliminary Invalidity Claim Charts and Disclosures, Civil Action No. 17-cv-00307-PJS-BRT, 60 pages (Jan. 12, 2018).
Exhibit 5 to Second Revised Preliminary Invalidity Claim Charts and Disclosures, Civil Action No. 17-cv-00307-PJS-BRT, 86 pages (Jan. 12, 2018).
Exhibit 6 to Second Revised Preliminary Invalidity Claim Charts and Disclosures, Civil Action No. 17-cv-00307-PJS-BRT, 79 pages (Jan. 12, 2018).

(56) References Cited

OTHER PUBLICATIONS

Commscope's Response to Clearfield's Second Revised Invalidity Claim Charts and Disclosure, Civil Action No. 17-cv-00307-PJS-BRT, 105 pages (Jan. 19, 2018).
Exhibit A to Response to Second Revised Preliminary Invalidity Claim Charts and Disclosures, Civil Action No. 17-cv-00307-PJS-BRT, 37 pages (Jan. 19, 2018).
Exhibit B to Response to Second Revised Preliminary Invalidity Claim Charts and Disclosures, Civil Action No. 17-cv-00307-PJS-BRT, 31 pages (Jan. 19, 2018).
Exhibit C to Response to Second Revised Preliminary Invalidity Claim Charts and Disclosures, Civil Action No. 17-cv-00307-PJS-BRT, 37 pages (Jan. 19, 2018).
Exhibit D to Response to Second Revised Preliminary Invalidity Claim Charts and Disclosures, Civil Action No. 17-cv-00307-PJS-BRT, 36 pages (Jan. 19, 2018).
Exhibit E to Response to Second Revised Preliminary Invalidity Claim Charts and Disclosures, Civil Action No. 17-cv-00307-PJS-BRT, 38 pages (Jan. 19, 2018).
Exhibit F to Response to Second Revised Preliminary Invalidity Claim Charts and Disclosures, Civil Action No. 17-cv-00307-PJS-BRT, 46 pages (Jan. 19, 2018).
Preliminary Response by Patent Owner Under 37 C.F.R. § 42.107, Case No. IPR2018-00154, 60 pages (Feb. 16, 2018).
Exhibit 2001—Declaration of Casimer DeCusatis in Support of Patent Owner's Preliminary Response, Case No. IPR2018-00154, 39 pages (Feb. 13, 2018).
Exhibit 2002—Declaration of Michael Lebby, Ph.D., in Support of Petition for Inter Partes Review of U.S. Pat. No. 8,705,929 (Ex. 1003 in Clearfield, Inc. v. CommScope Technologies LLC, IPR2017-02122), Case No. IPR2018-00154, 141 pages (Feb. 16, 2018).
Exhibit 2003—Exhibit 10 to Clearfield Inc.'s Second Revised Preliminary Invalidity Claim Charts and Disclosures, served on Jan. 12, 2018, Case No. IPR2018-00154, 43 pages (Feb. 16, 2018).
Defendant Clearfield Inc.'s Revised Preliminary Invalidity Claim Charts and Disclosures, Civil Action No. 17-cv-00307-PJS-BRT, 51 pages (Dec. 11, 2017).
Exhibit 1 to Revised Preliminary Invalidity Claim Charts and Disclosures, Civil Action No. 17-cv-00307-PJS-BRT, 42 pages (Dec. 11, 2017).
Exhibit 2 to Revised Preliminary Invalidity Claim Charts and Disclosures, Civil Action No. 17-cv-00307-PJS-BRT, 50 pages (Dec. 11, 2017).
Exhibit 3 to Revised Preliminary Invalidity Claim Charts and Disclosures, Civil Action No. 17-cv-00307-PJS-BRT, 32 pages (Dec. 11, 2017).
Exhibit 4 to Revised Preliminary Invalidity Claim Charts and Disclosures, Civil Action No. 17-cv-00307-PJS-BRT, 42 pages (Dec. 11, 2017).
Exhibit 5 to Revised Preliminary Invalidity Claim Charts and Disclosures, Civil Action No. 17-cv-00307-PJS-BRT, 69 pages (Dec. 11, 2017).
Exhibit 6 to Revised Preliminary Invalidity Claim Charts and Disclosures, Civil Action No. 17-cv-00307-PJS-BRT, 59 pages (Dec. 11, 2017).
Table A to Revised Preliminary Invalidity Claim Charts and Disclosures, Civil Action No. 17-cv-00307-PJS-BRT, 59 pages (Dec. 11, 2017).
Joint Status Report, CommScope Technologies LLC v. Clearfield, Inc., Case No. 0:17-cv-00307-PJS-BRT, 11 pages (Feb. 9, 2018.
Joint Status Report Exhibit A, CommScope Technologies LLC v. Clearfield, Inc., Case No. 0:17-cv-00307-PJS-BRT, 33 pages (Feb. 9, 2018).
Joint Status Report Exhibit B, CommScope Technologies LLC v. Clearfield, Inc., Case No. 0:17-cv-00307-PJS-BRT, 21 pages (Feb. 9, 2018).
Stipulation of Dismissal, CommScope Technologies LLC v. Clearfield, Inc., Case No. 0:17-cv-00307-PJS-BRT, 2 pages (Feb. 19, 2018).
Order of Dismissal, CommScope Technologies LLC v. Clearfield, Inc., Case No. 0:17-cv-00307-PJS-BRT, 1 page (Feb. 20, 2018).

\* cited by examiner

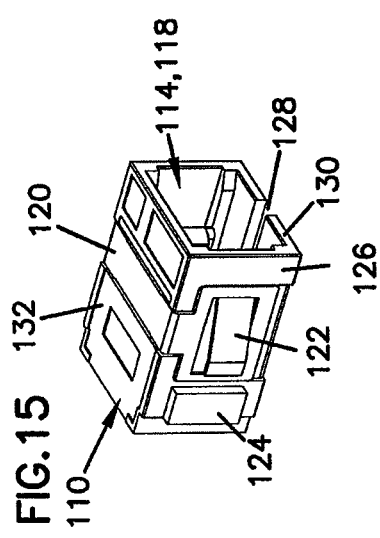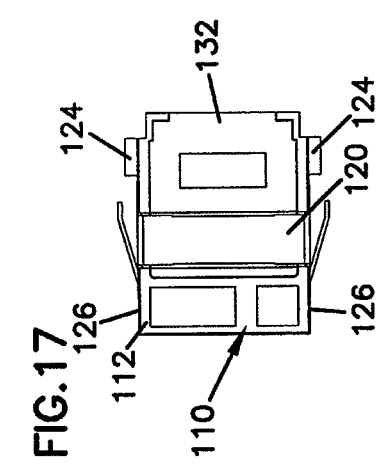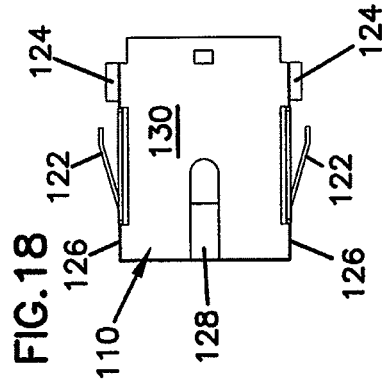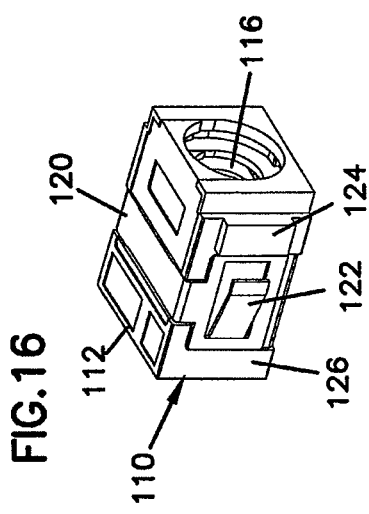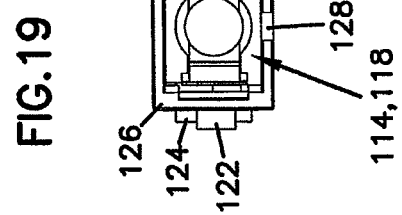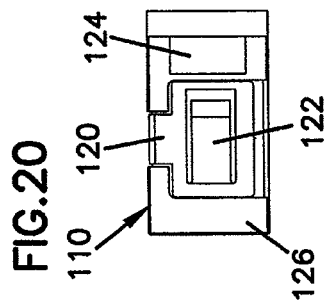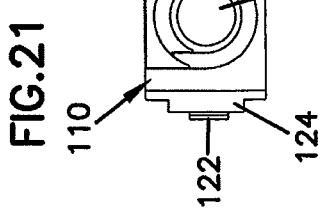

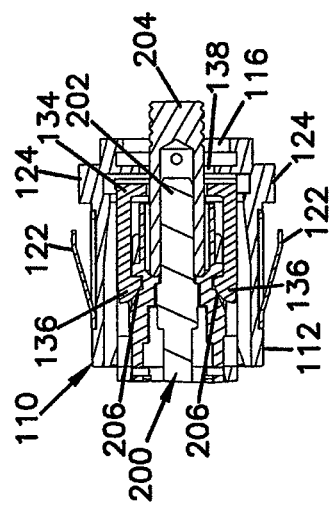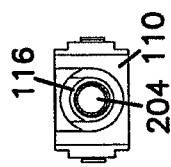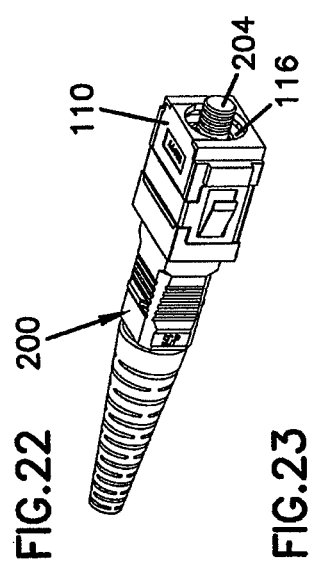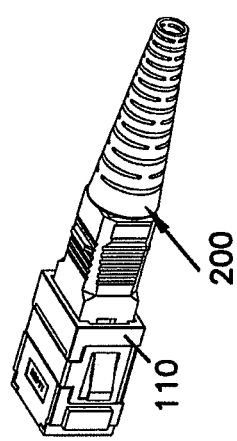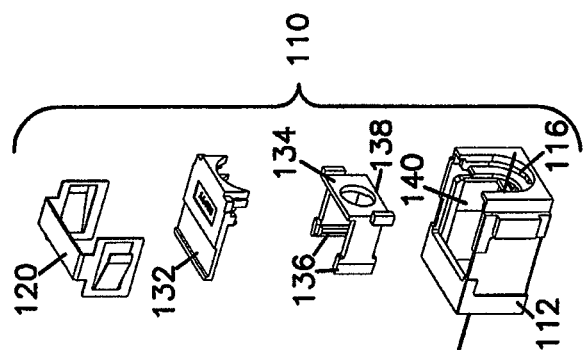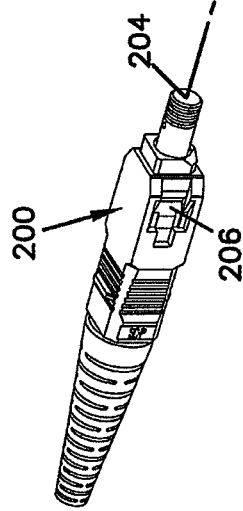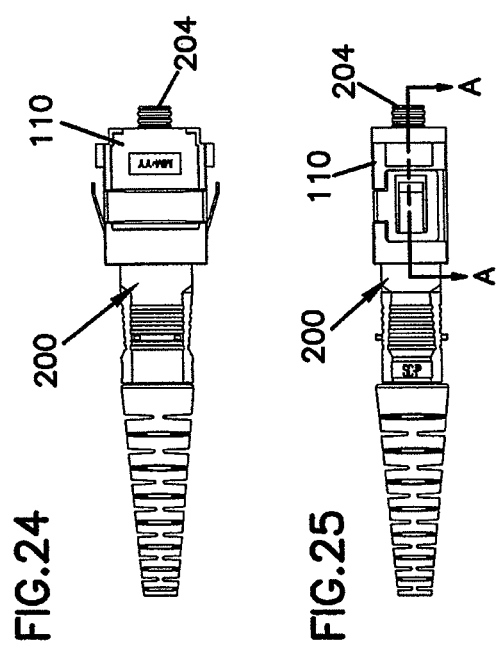

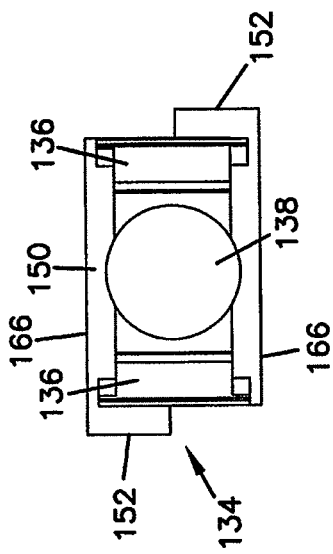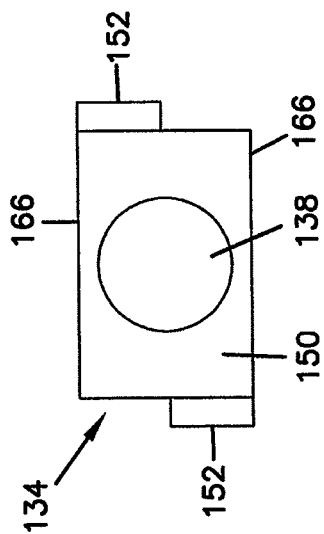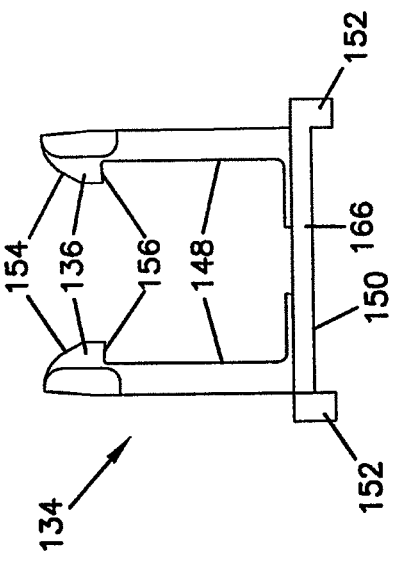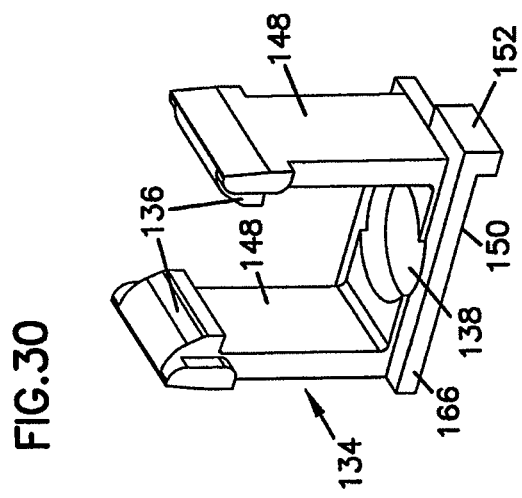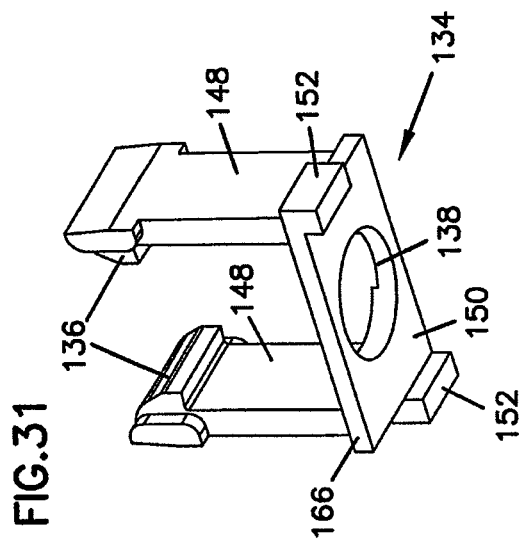

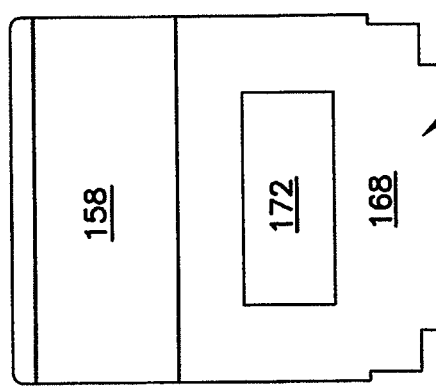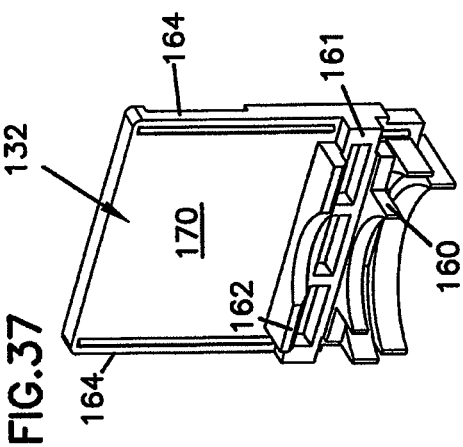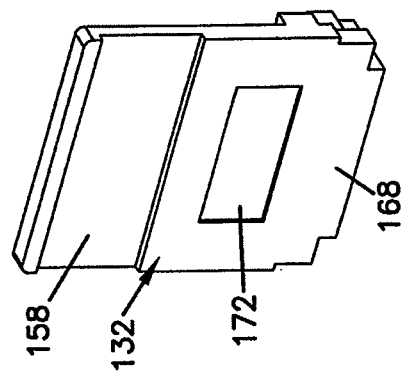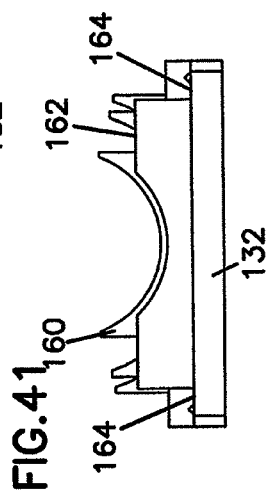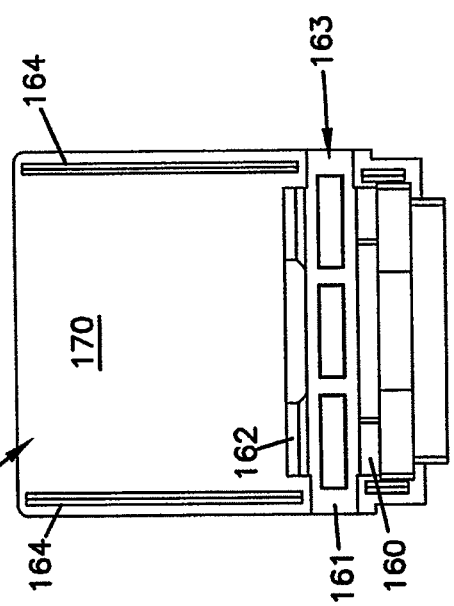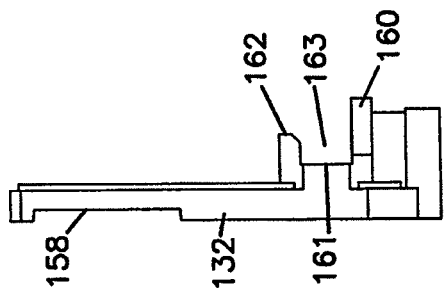

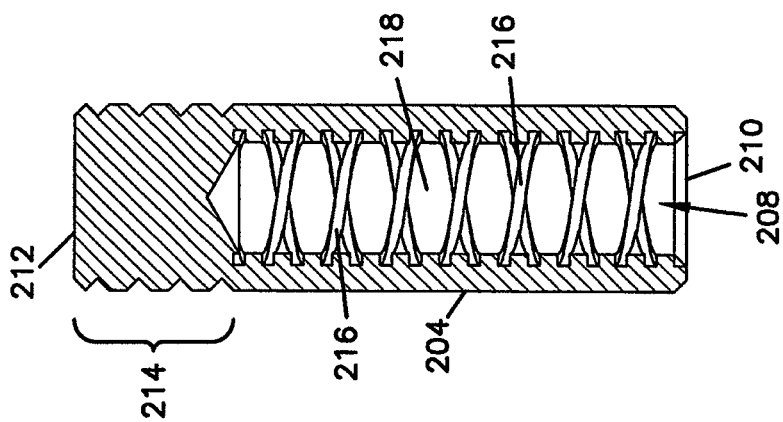
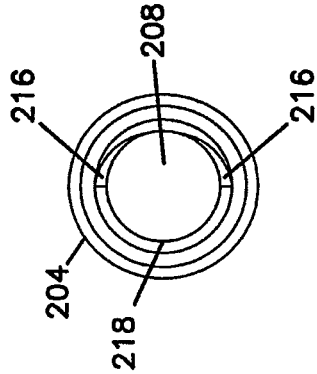
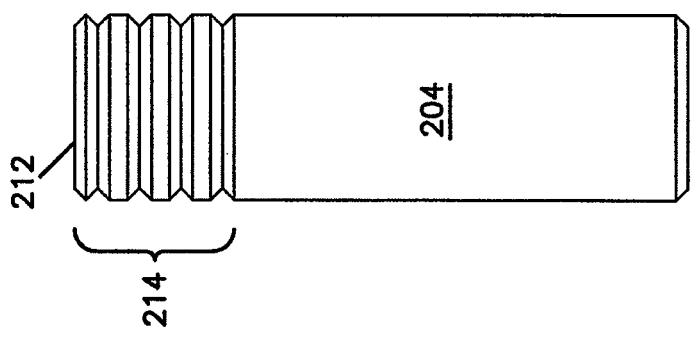
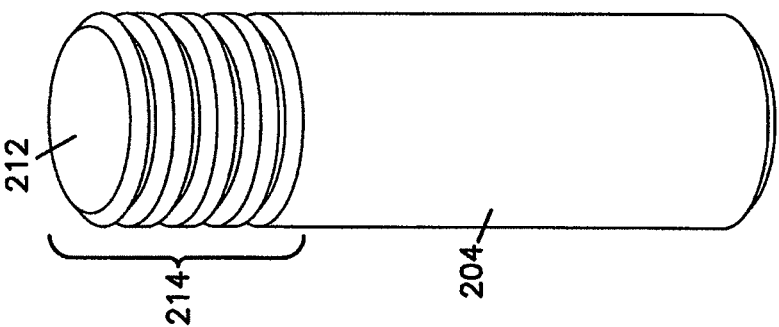

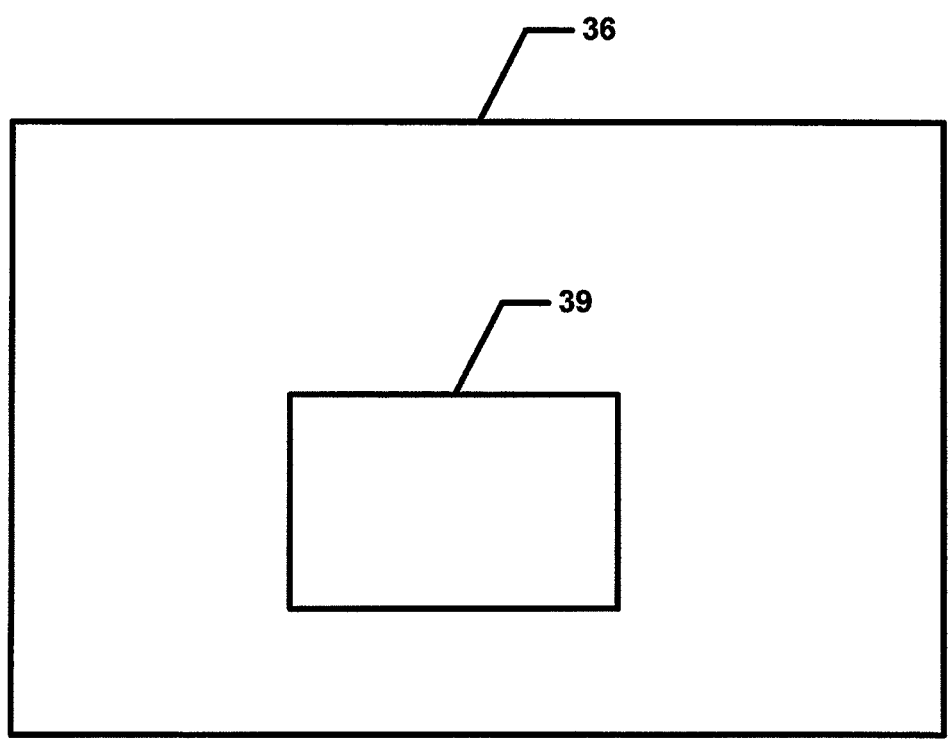

TELECOMMUNICATIONS CONNECTION CABINET

CROSS REFERENCE TO RELATED APPLICATIONS

This application is a continuation of application Ser. No. 15/365,226, filed Nov. 30, 2016, now U.S. Pat. No. 10,151,896, which is a continuation of application Ser. No. 14/981,322, filed Dec. 28, 2015, now U.S. Pat. No. 9,541,724, which is a continuation of application Ser. No. 14/814,047, filed Jul. 30, 2015, now U.S. Pat. No. 9,250,408, which is a continuation of application Ser. No. 14/341,938, filed Jul. 28, 2014, now U.S. Pat. No. 9,304,276, which is a continuation of application Ser. No. 13/768,378, filed Feb. 15, 2013, now U.S. Pat. No. 8,811,791, which is a continuation of application Ser. No. 13/176,577, filed Jul. 5, 2011, now U.S. Pat. No. 8,401,357, which is a continuation of application Ser. No. 12/908,238, filed Oct. 20, 2010, now U.S. Pat. No. 7,995,894, which is a continuation of application Ser. No. 12/276,886, filed Nov. 24, 2008, now U.S. Pat. No. 7,844,159, which is a continuation of application Ser. No. 11/729,310, filed Mar. 27, 2007, now U.S. Pat. No. 7,457,503, which is a continuation of application Ser. No. 10/613,764, filed Jul. 2, 2003, now U.S. Pat. No. 7,233,731, which applications are incorporated herein by reference in their entirety.

TECHNICAL FIELD

The present invention generally relates to cabinets for connecting telecommunications cables.

BACKGROUND

Installation of telecommunications equipment to support the current and potential future needs of a particular group of customers may make it desirable to install more capacity than the current customer base alone may dictate. Excess capacity may be installed to permit the easy addition of new circuits for new or existing customers. A telecommunications connection cabinet with such excess capacity may be pre-configured at a fabrication facility and installed in the field to include more circuits than are necessary to provide service to the existing customers. Prior to the linkage of these surplus or future expansion circuits to customers, it is desirable to provide for storage, organization and protection of the patch cords or other connection cables within the cabinet.

Such connection cables might include fiber optic patch cords terminated with fiber optic connectors. Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. No. 5,317,663, and U.S. Pat. No. 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

It is desirable to improve the known methods and apparatus for protecting the polished end face of a fiber optic connector within telecommunications equipment.

SUMMARY

A telecommunications cabinet comprising a top, a floor, a pair of opposing sides, a front wall and a rear wall defining an interior, the front including an access door for accessing the interior. Within the interior are mounted a cable management structure, an adapter panel with an adapter configured to optically connect two optical fiber cables terminated with fiber optic connectors, and a fiber optic connector holder mounted in openings of the adapter panel. The connector holder has an opening configured to receive a fiber optic connector with a dust cap, the opening accessible from a front side of the adapter panel. A fiber optic connector including a ferrule with a polished end face holding an end of an optical fiber with a dust cap placed about the ferrule and polished end face is inserted within the opening of a fiber optic connector holder.

A telecommunications connection rack with a rack mounting structure, and a cable management structure, a fanout panel and an adapter panel mounted to the rack mounting structure. The adapter panel includes a plurality of adapter openings sized to receive and mount fiber optic adapters for optically connecting optical fibers within fiber optic cables terminated with fiber optic connectors, and a plurality of optical fiber adapters mounted within the openings. A cable connector holder panel is mounted to the rack mounting structure and includes a plurality of openings sized similarly to the openings in the adapter panel and a plurality of fiber optic connector holders mounted within the openings. Each of the fiber optic connector holders is configured to receive a fiber optic connector with a dust cap in place about a polished end face of a ferrule holding the end of an optical fiber. The cable management structure is configured to direct a fiber optic cable from the fanout panel to each of the adapter panel and the cable connector holder panel and to store excess cable length.

A method of connecting telecommunications service cables including providing a equipment mounting rack with a fanout module, an adapter module, a connector holder module and a cable management structure mounted to the rack. A multi-strand optical fiber service cable is directed to the fanout module. The multiple strands of the service cable are separated into individual fiber patch cords extending from the fanout module, with a distal end of each patch cord terminated with a fiber optic connector. The fiber optic connectors include a dust cap positioned about a polished end face. A first patch cord is extended from the fanout module into the cable management structure so that the connector of the first patch cord is proximate a fiber optic connector holder mounted within an opening in a front of the connector holder module. The fiber optic connector of the first patch cord is inserted into the fiber optic connector holder without removing the dust cap. The connector of the first patch cord is withdrawn from the connector holder. The dust cap is removed from the polished end face. The first patch cord is adjusted within the cable management structure so that the connector is adjacent an fiber optic adapter mounted within an opening in a front of the adapter module. The connector of the first patch cord is inserted into the adapter so that the optical fiber of the patch cord is optically connected to a second connector inserted within an opposite end of the adapter.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 15 is a first perspective view of a fiber optic connector holder according to the present invention.

FIG. 16 is a second perspective view of the fiber optic connector holder of FIG. 15.

FIG. 17 is a top view of the fiber optic connector holder of FIG. 15.

FIG. 18 is a bottom view of the fiber optic connector holder of FIG. 15.

FIG. 19 is a first end view of the fiber optic connector holder of FIG. 15.

FIG. 20 is a side view of the fiber optic connector holder of FIG. 15.

FIG. 21 is a second opposite end view of the fiber optic connector holder of FIG. 15.

FIG. 22 is a first perspective view of system for holder a fiber optic connector including the fiber optic connector holder of FIG. 15 with a fiber optic connector inserted.

FIG. 23 is a second perspective view of the system for holding a fiber optic connector of FIG. 22.

FIG. 24 is a top view of the system for holding a fiber optic connector of FIG. 22.

FIG. 25 is a side view of the system for holding a fiber optic connector of FIG. 22.

FIG. 26 is an end view of the system for holding a fiber optic connector of FIG. 22.

FIG. 27 is a cross-sectional view of the system for holding a fiber optic connector of FIG. 8, taken along line A-A in FIG. 25.

FIG. 28 is an exploded perspective view of the system for holding a fiber optic connector of FIG. 22.

FIG. 30 is a first perspective view of an inner housing of the fiber optic connector holder of FIG. 15.

FIG. 31 is a second perspective view of the inner housing of FIG. 30.

FIG. 32 is a top view of the inner housing of FIG. 30.

FIG. 33 is a side view of the inner housing of FIG. 30.

FIG. 34 is a first end view of the inner housing of FIG. 30.

FIG. 35 is a second end view of the inner housing of FIG. 30.

FIG. 36 is a first perspective view of the cover of the fiber optic connector holder of FIG. 15.

FIG. 37 is a second perspective view of the cover of FIG. 36.

FIG. 38 is a top view of the cover of FIG. 36.

FIG. 39 is a side view of the cover of FIG. 36.

FIG. 40 is a bottom view of the cover of FIG. 36.

FIG. 41 is a first end view of the cover of FIG. 36.

FIG. 42 is a second end view of the cover of FIG. 36.

FIG. 49 is a perspective view of the dust cap of the fiber optic connector of FIG. 29.

FIG. 50 is a side view of the dust cap of FIG. 49.

FIG. 51 is an end view of the dust cap of FIG. 49.

FIG. 52 is a cross-sectional view of the dust cap of FIG. 49.

FIG. 53 is a block schematic diagram showing a splitter arranged within an adapter module in accordance with the principles of the present disclosure.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
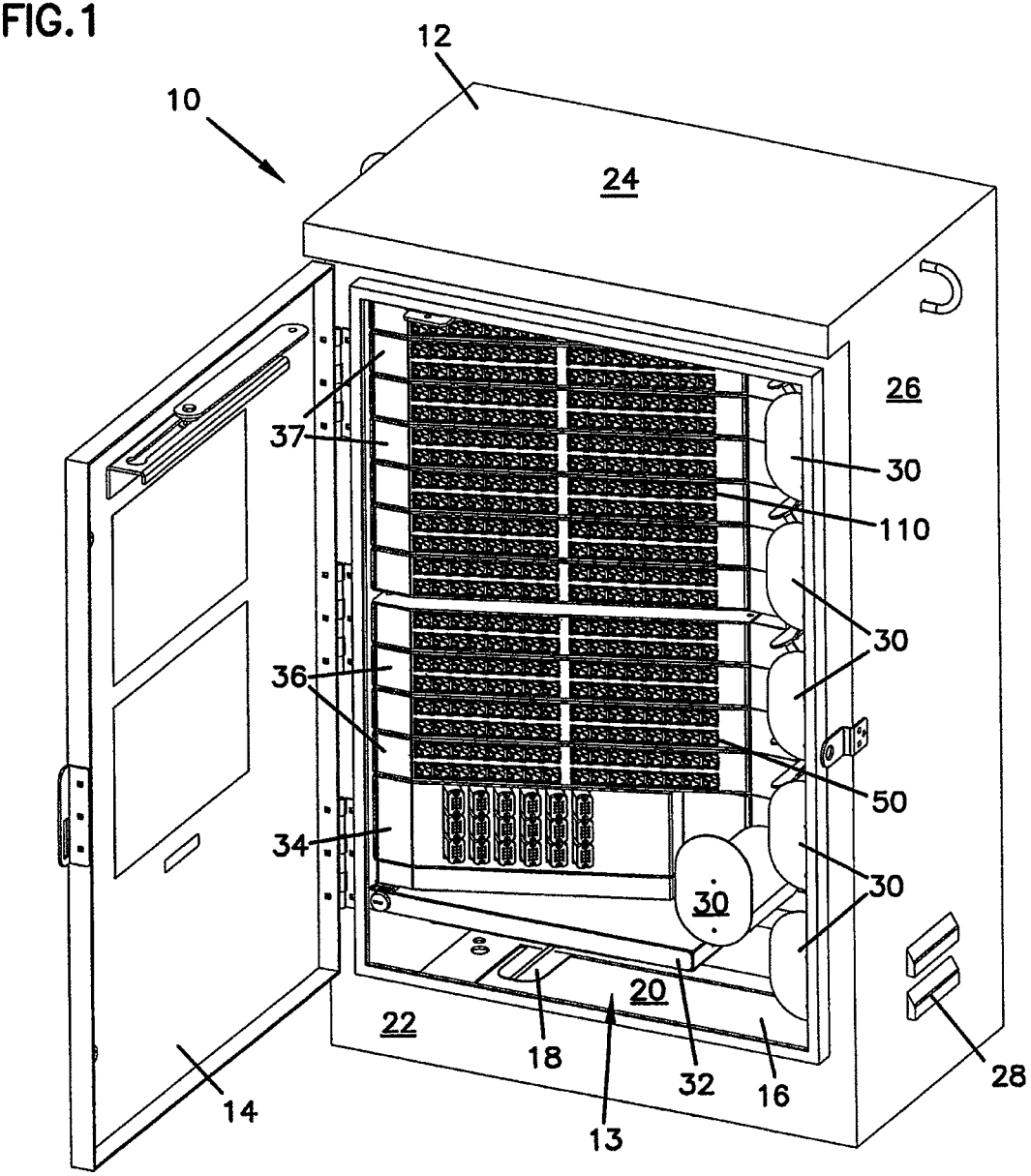
FIG. 1 is front perspective view of a telecommunications connection cabinet according to the present invention with an access door to the front of the cabinet open.

Telecommunications connection cabinets, such as cabinet 10 shown in FIG. 1, are used to permit organization and interconnection of different telecommunications infrastructure cables. A multi-strand telecommunications service cable such as an IFC or ribbon cable with multiple optical fibers, may be used to electronically or optically link widely spaced facilities. The service cable may be directed into cabinet 10 where it may be connected to a fanout module 34 and separated into individual fibers. Each of these strands may be connected to a patch cord 46 which may be terminated with a fiber optic connector. The fiber optic connector of patch cord 46 (such as connector 200 described below) may then be inserted into the front of an adapter 50 mounted to an adapter module 36 within cabinet 10.

Adapter module 36 may also include a splitter 39 (see FIG. 53) that combines the signals from up to 32 individual patch cords 46 into a single optical fiber cable. As shown in the FIGS., there are four adapter modules 36 with splitters 39. As configured, cabinet 10 may have up to four optical fibers carrying the signals from up to 128 patch cords 46. These up to four optical fiber cables are directed to a splice module 32 mounted within cabinet 10. These up to four cables are available to splice in splice drawer 32 for communication of the signals to other downstream telecommunication equipment.

For patch cords 48 connected to circuits for which connection to downstream telecommunications equipment is anticipated but not yet required, these patch cords are routed instead to a connector holder module 37. Connectors 200 terminating patch cords 48 are directed into a connector holder 110. These patch cords 48 are not optically linked to any downstream equipment and are being stored and protected for damage or contamination in connector holders 110 until needed.

Figure 2:
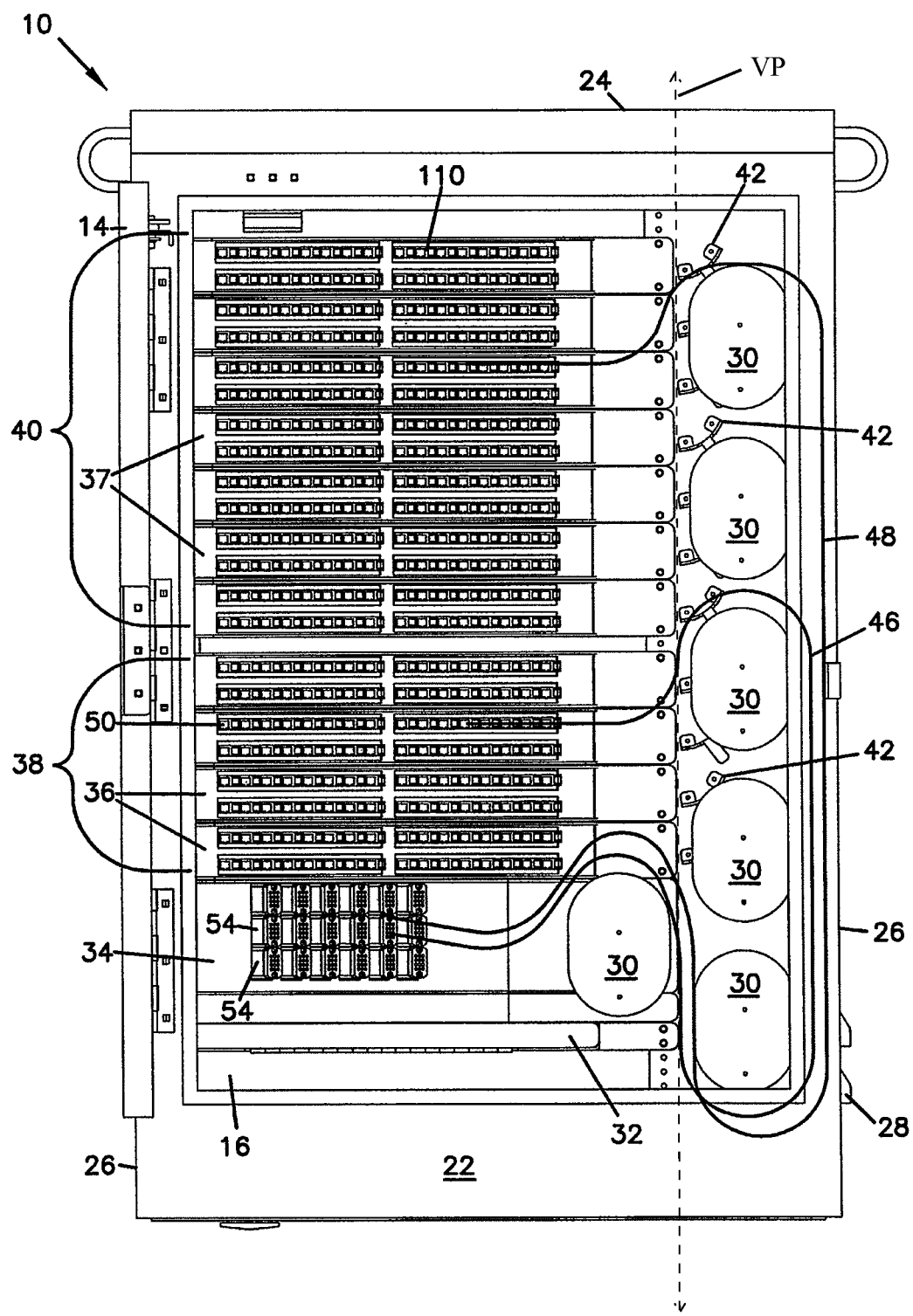
FIG. 2 is front view of the telecommunications connection cabinet of FIG. 1 with illustrative cable paths.

Referring now to FIGS. 1 and 2, cabinet 10 includes a housing 12 with a top 24, opposing sides 26, a front wall 22 and a floor 20. A rear wall 23, shown in FIG. 4 below, cooperates with the top, sides, front and floor to enclose the equipment mounted within housing 12 in an interior 13. Sides 26 include vent openings 28 which are shielded to prevent rain, snow and debris entry into interior 13. Front wall 22 includes a front access opening 16 permitting access to the front of the equipment mounted within interior 13. A door 14 is hinged to one side of opening 16 and closes off opening 16 to seal interior 13 from the elements when closed. A cable entry 18 in floor 20 allows the multi-strand telecommunications service cables to be fed into interior 13 and customer cables from the splice tray to exit interior 13. While only one opening 18 is shown in FIG. 1, additional openings in floor 20 may be provided depending on the size and number of cables entering and exiting cabinet 10.

Mounted within interior 13 is a variety of telecommunications equipment and supporting structure. As will be described below, interior 13 includes a rack mounting structure to which this telecommunications equipment is mounted. The equipment within interior 13 includes splice module 32, fanout module 24, a plurality of adapter modules 36, and a plurality of connector holder modules 37. Adjacent this equipment are mounted a plurality of cable storage spools 30 and bend radius protectors 42. Spools 30 and radius protectors 42 cooperate to direct cables between the fronts of the different telecommunications equipment mounted within interior 13.

Within interior 13, adapter modules 36 and connector holder modules 37 include a module housing, which will be discussed below. Each of the housings for modules 36 and 37 are mounted within the internal rack mounting structure of cabinet 10. Adapter modules 36 are grouped together in an active connection stack 38 and connector holder modules 37 are grouped together in a storage stack 40. Fanout module 34 is mounted beneath active connection stack 38 as the service cable enters cabinet 10 from below through opening 18. As configured in the drawings, cabinet 10 also directs the customer cables through floors 20, so splice module 32 is located below the active connection and storage areas. If the service and/or customer cables enter cabinet 10 through an opening through or adjacent to top 24, fanout module 34 and splice module 32 may be positioned above the active connection and storage areas. A vertical reference plane VP extends into and out of the page in FIG. 2. The active connection stack 38, the storage stack 40, and the fanout module 34 are on the left side of the vertical reference plane VP. The radius protectors 42 and a vertical column of the cable storage spools 30 are on the right side of the vertical reference plane VP.

Figure 4:
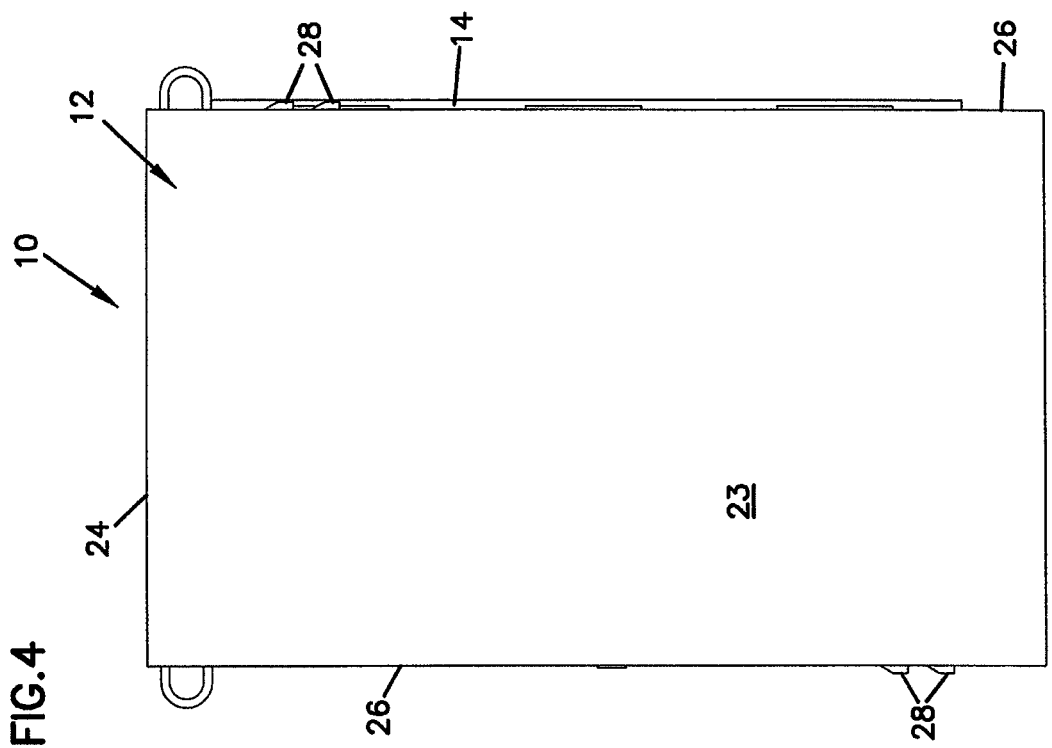
FIG. 4 is a rear view of the telecommunications connection cabinet of FIG. 3.
Figure 3:
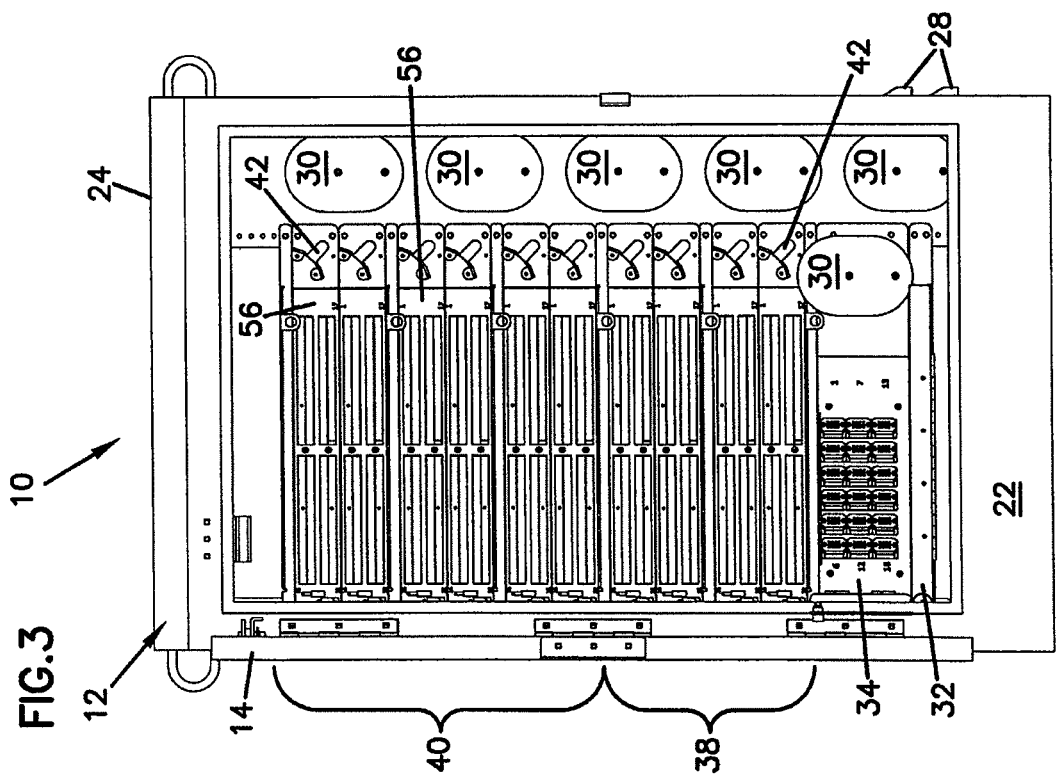
FIG. 3 is a front view of the telecommunications connection cabinet of FIG. 1 with the adapters and connector holders removed.
Figure 6:
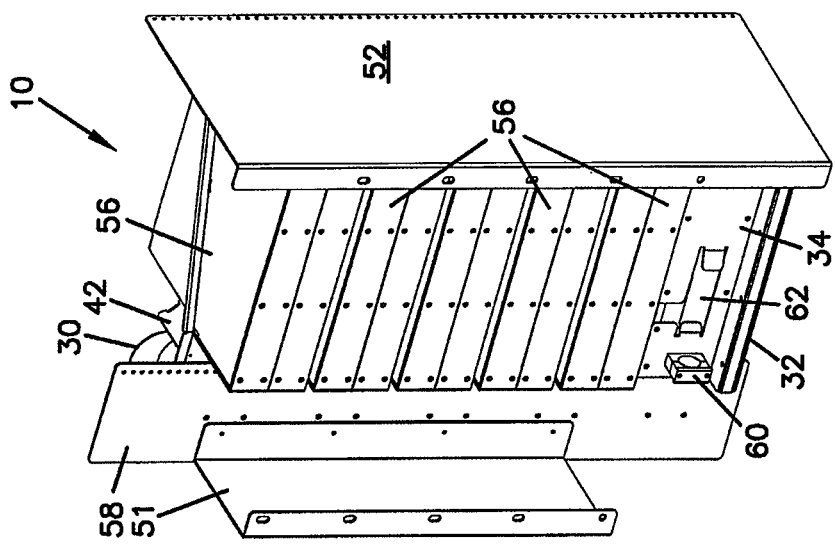
FIG. 6 is a rear perspective view of the rack, modules and cable management structures of FIG. 5.
Figure 5:
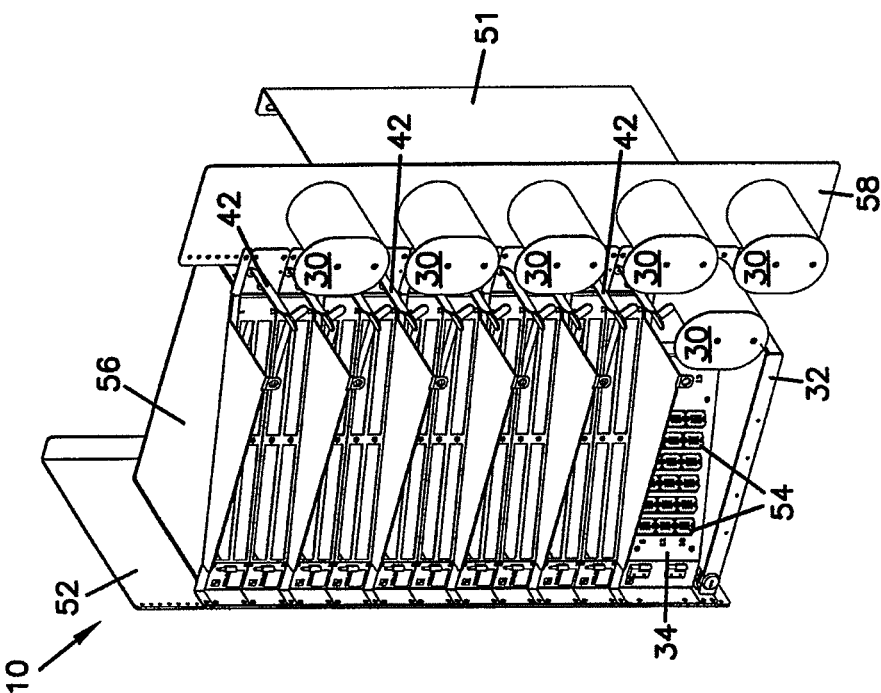
FIG. 5 is a front perspective view of the rack, modules and cable management devices of the telecommunications cabinet of FIG. 1 removed from the cabinet.
Figure 8:
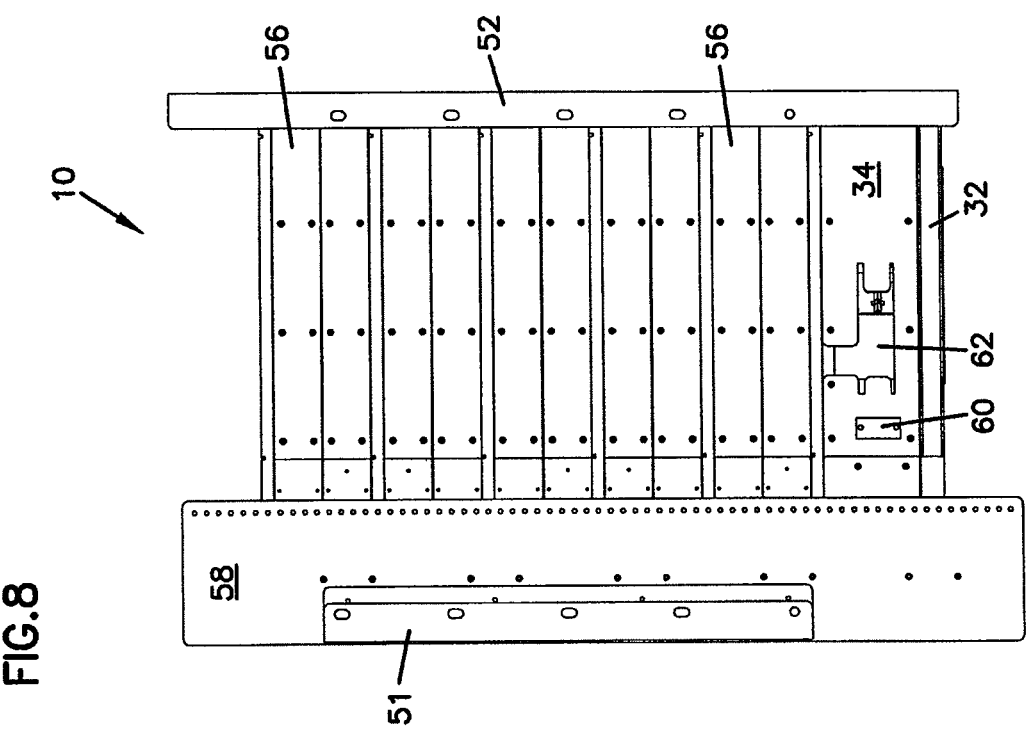
FIG. 8 is a rear view of the rack, modules and cable management structures of FIG. 5.
Figure 7:
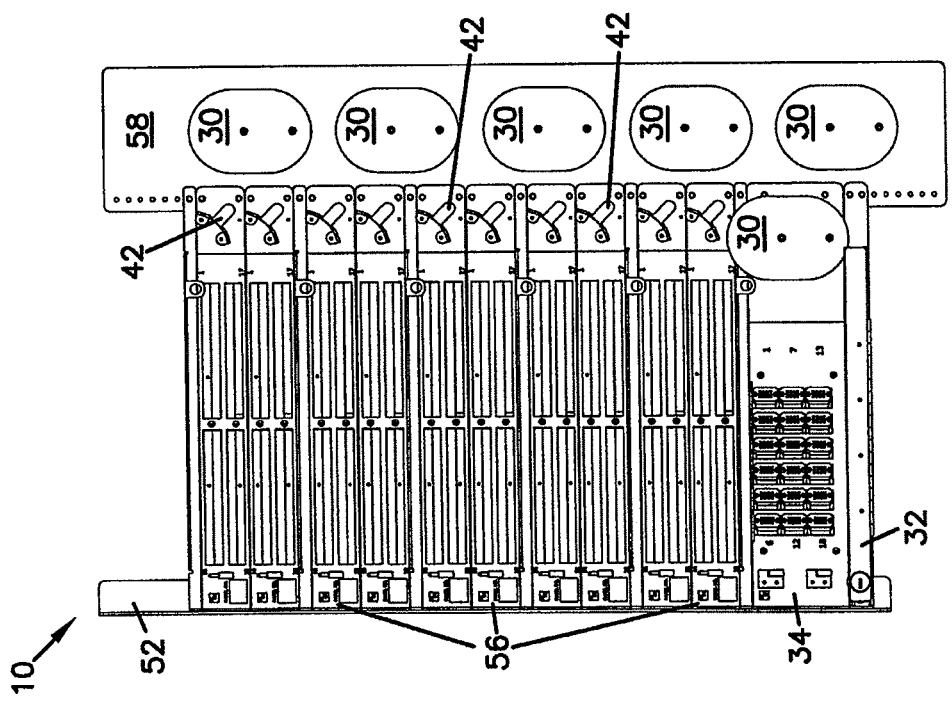
FIG. 7 is a front view of the rack, modules and cable management structures of FIG. 5.

Referring now also to FIGS. 3 and 4, cabinet 10 is configured to be a front access cabinet and no provision is made for allowing access through rear wall 23. In the field, a technician would only need to access the equipment mounted within cabinet 10 through front opening 16 to connect or disconnect a particular customer's circuit. All connections between the various equipment behind the equipment in the interior 13 are not easily accessible and are anticipated to be pre-configured and cabled before cabinet 10 leaves the manufacturing facility. Alternatively, rear wall 23 could be configured with an access door if such access is desired.

Modules 34, 36 and 37 include front faces which are angled with respect to front wall 22 to improve the positioning of cables between the cable management structures (including spools 30 and radius limiters 42) and adapters 50 and connector holders 110.

As shown in FIGS. 3 and 4, connector holders 110, adapters 50 and any splitters within modules 36 and 37 have been removed. The module housing 56 for each module 36 and 37 may be identical and will be described further below. As shown in FIGS. 1 and 2, each module 37 includes 32 connector holders in each of seven connector holder modules 37. This provides a total storage capacity as configured of 224 connectors 200.

Fanout module 34 as shown in the FIGS. includes eighteen cable breakouts 54. Each cable breakout 54 allows for separation of a service cable or subunit of a service cable into a maximum of 12 fibers. This provides a maximum capacity for fanout module 34 to receive up to eighteen service cables or subunits of service cables, and separate out up to 216 patch cords 46 and 48 from these service cables. This permits a connector holder in storage area 40 for each of the maximum number of patch cords 46 and 48 that may extend from fanout module 34.

Patch cords 46 and 48 may be terminated with fiber optic connectors such as connector 200 shown in FIGS. 22 through 28, below. Optical fiber within these cables may be terminated at a polished end face held by a ferrule 202 in connector 200, as is well known in the art and shown in U.S. Pat. No. 5,317,663, incorporated herein by reference. These polished end faces and ferrules 202 need to be stored and protected until needed for connecting to other fiber optic cables or optical signal equipment.

Often a dust cap 204 may be placed about ferrule 202 and the polished end face of the optical fiber to protect the polished end face from contamination from dust, fingerprints or other items which might degrade optical signal transmission. While it is known to store these in known optical fiber adapters until the fiber within the attached cable is needed to connect to another fiber optic cable to optical signal equipment, such storage is less than ideal as adapters do not seal the polished end face from contamination as well as dust cap 204 securely fit and held about ferrule 202 of connector 200. Known adapters do not permit insertion of connector 200 which still has dust cap 204 in place about ferrule 202 and the polished end face of the cable.

Referring now to FIGS. 15 and 16, connector holder 110 includes a main housing 112 defining an interior cavity 114. An open end 118 permits insertion of a connector 200 into cavity 114 while an opposite opening 116 permits dust cap 204 to protrude from connector holder 10. A clip 120 is positioned about main housing 112 and includes a pair of spring mounting clips 122. A pair of flanges 124 extends from opposing sides 126 of main housing 112 adjacent spring clips 122. Clips 122 and flanges 124 cooperate to releasably mount holder 10 to an opening in a bulkhead as is shown below.

Main housing 112 also includes a bottom 130 with a keyway 128 to receive a keyed extension of connector 200 to consistently orient connector 200 for insertion into cavity 114. Opposite bottom 130 is an open top closed by a cover 132. This is shown in more detail in FIG. 26, below. FIGS. 17 through 21 provide additional views of connector holder 110.

Referring now to FIGS. 22 through 27, connector 110 is shown with connector 200 positioned within cavity 118. Dust cap 204 extends from opening 116 of connector holder 110 while connector 200 is inserted through open end 114.

Referring now to FIGS. 27 and 28, connector holder 110 further includes an inner housing 134 with a pair of opposing releasable catches 136 and an opening 138 sized to receive dust cap 204. Inner housing 134 is positioned within main housing 112 through an open top 140 with opening 138 adjacent opening 116 and catches 136 adjacent open end 114. Cover 132 is then positioned within open top 140 and clip 120 placed about cover 132 and main housing 112. Cover 132 may be sealed within open top 140 by gluing, ultrasonic welding or a variety of known fastening techniques. Connector 200 includes a pair of opposing recesses 206 which receive catches 136 when connector 200 is inserted within holder 110.

As shown, connector 200 and holder 110 are SC style. Connector 200 and holder 110 may conform to other styles and formats of electrical connectors and adapters without straying from the spirit of the present invention.

Figure 29:
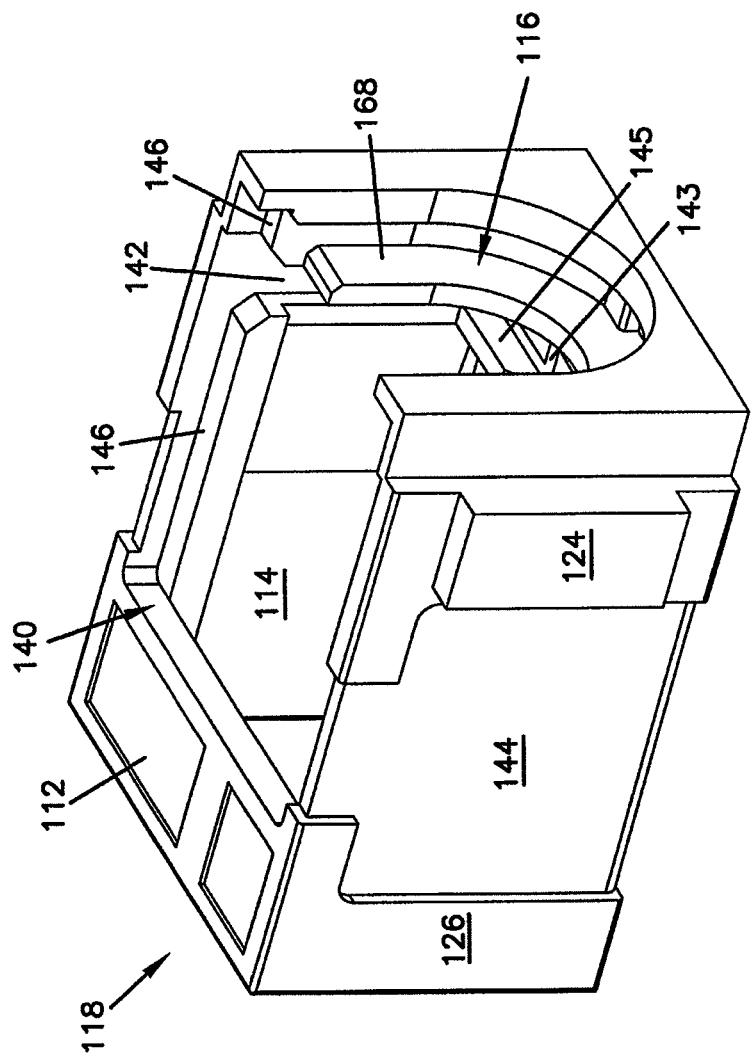
FIG. 29 is a perspective view of the main housing of the fiber optic connector holder of FIG. 15.
Figure 44:
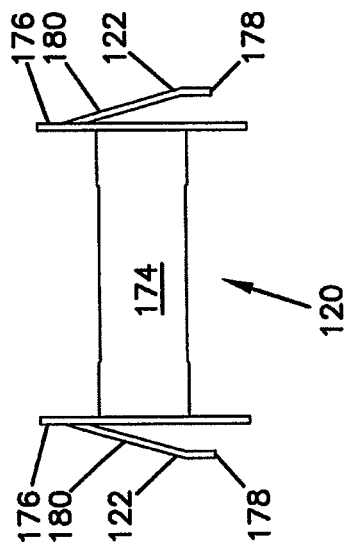
FIG. 44 is an end view of the clip of FIG. 43.
Figure 46:
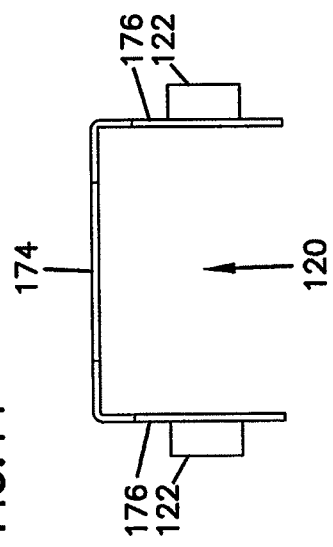
FIG. 46 is a bottom view of the clip of FIG. 43.
Figure 43:
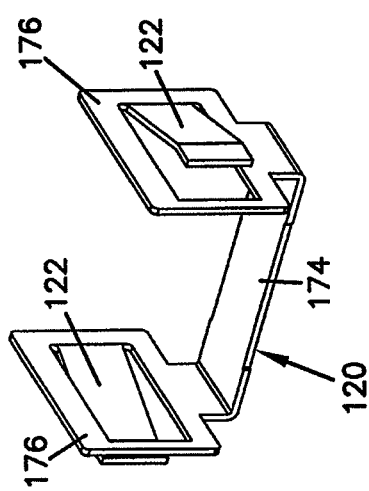
FIG. 43 is a perspective view of the clip of the fiber optic connector holder of FIG. 29.
Figure 45:
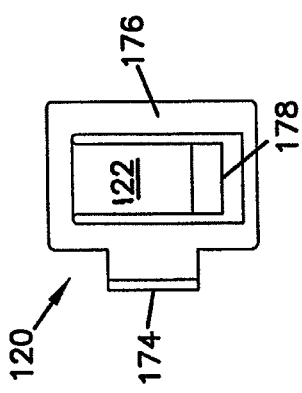
FIG. 45 is a side view of the clip of FIG. 43.

Referring now to FIG. 29, main housing 112 also includes a slot 142 along both sides of cavity 114 to receiving and positioning a flange of inner housing 134 within cavity 114. A recess 144 is provided along sides 126 to receive clip 120. Open top 140 includes a ledge 146 upon which cover 132 is positioned to close cavity 114. An outer bulkhead 168 forms a portion of opening 116. An inner bulkhead 145 is positioned spaced apart from outer bulkhead 168 and these bulkheads cooperate to define slot 142. Between bulkheads 145 and 168 is a positioning surface 143 defining the bottom of slot 142.

Referring now to FIGS. 30 to 35, inner housing 134 includes a pair of clip arms 148 extending from a cross piece 150. Opening 138 for receiving dust cap 204 of connector 200 is in cross piece 150. Catches 136 are at the end of clip arms 148 opposite cross piece 150. Cross piece 150 includes a pair of flanges 152 which are received in slots 142 in main housing 112. As shown in FIG. 32, catches 136 include a ramped portion 154 which is engaged by connector 200 as connector 200 is inserted within cavity 114 through open end 118 of connector holder 110. Clip arms 148 are deflected outward allowing connector 200 to pass between catches 136. When connector 200 is fully inserted within cavity 114 (as shown in FIG. 27) catches 136 are received within recesses 206 and a retaining surface 156 of each catch 136 holds connector 200 within cavity 114.

Inner housing 134 is configured to permit insertion within slots 142 of cavity 114 of main housing 112 in either of two orientations. A pair of edges 166 of cross piece 150 properly position inner housing within cavity 114 with regard to cover 132 and main housing 112 so that opening 138 is aligned to receive dust cap 204.

Referring now to FIGS. 36 to 42, cover 132 includes a recess 158 for receiving clip 120 along an outer surface 168. Also in outer surface 168 is a recess 172 for receiving indicia. Along an inner surface 170 are formed a pair of edges 164 configured to be received upon ledges 146 of main housing 112. Extending from inner surface 170 is an outer flange 160 which cooperates with bulkhead 168 within main housing 112 to define opening 116. Also extending from inner surface 170 is an inner flange 162 which is spaced apart from outer flange 160 to form a slot 163. Slot 163 cooperates within slot 142 of main housing 112 to receive flanges 152 of inner housing 134.

At the top of slot 163 is a positioning surface 161 which cooperates with one of edges 166 of inner housing 134 to position inner housing 134 within cavity 114 so that opening 138 of inner housing 134 is aligned with opening 116. When assembled as connector holder 110, positioning surface 143 of main housing 112 and positioning surface 161 of cover 132 cooperate to engage both edges 166 of inner housing 134. Slot 142 of main housing 112 and slot 163 of cover 132 cooperate to capture flanges 152 of inner housing 134.

Referring now to FIGS. 43 to 46, clip 120 includes a cross piece 174 and a pair of opposing sides 176. Spring clips 122 are formed in sides 176. Sides 176 are received within recesses 144 of main housing 112 and cross piece 174 is received within recess 158 of cover 132. It is anticipated that clip 120 will be made of a resilient deformable metal to facilitate insertion and removal from an opening in a bulkhead. Spring clips 122 each include an end 178 and a ramped surface 180.

Figure 48:
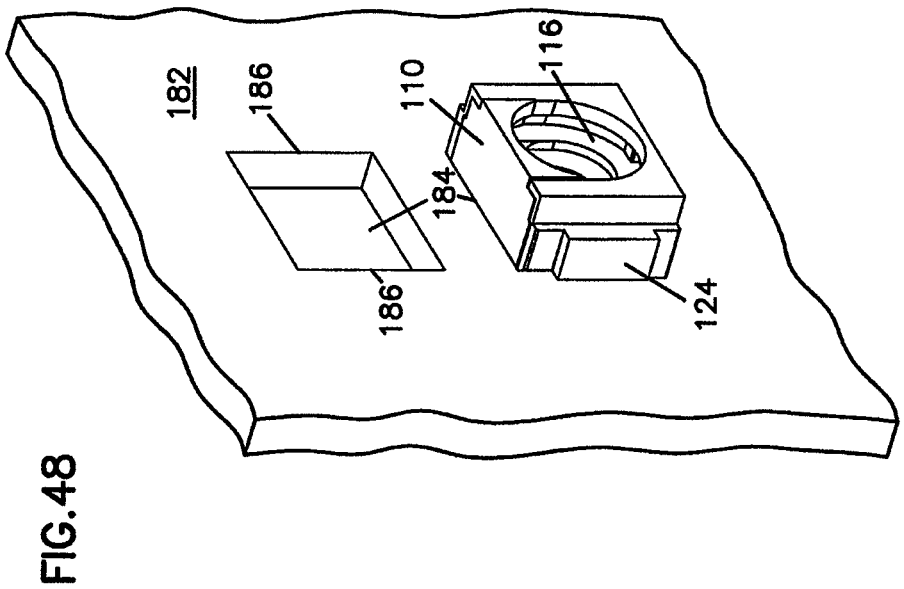
FIG. 48 is a perspective view of a bulkhead including a plurality of openings for receiving fiber optic connector adapters and the fiber optic connector holder of FIG. 15 inserted within one of the openings.
Figure 47:
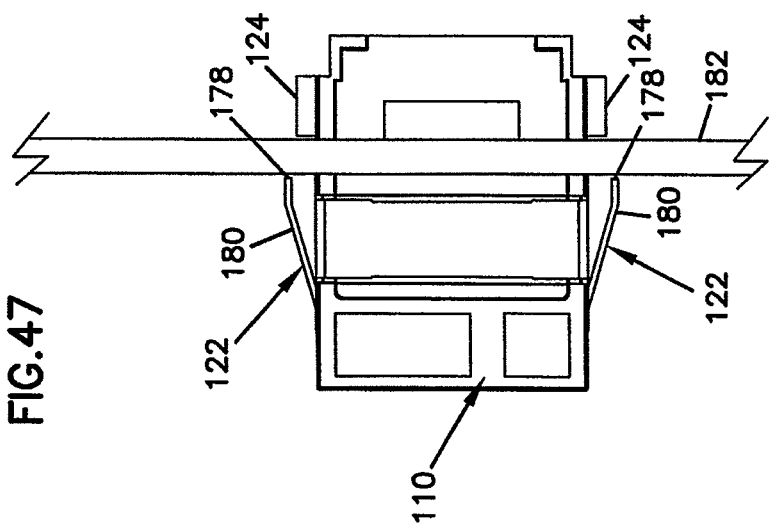
FIG. 47 is a top view of the fiber optic connector holder of FIG. 15 inserted within an opening in a bulkhead.

FIGS. 47 and 48 shows fiber optic connector holder 110 inserted within an opening 184 in a bulkhead 182. Bulkhead 182 may be part of a piece of telecommunications switching equipment such as a panel for making a plurality of connections between optical fiber cables including a plurality of openings 84 for adapters, as shown in FIG. 48, or in connector holder module 37. Alternatively, bulkhead 182 may include only a single opening 184 where only a single fiber optic connector holder 110 is needed.

Open end 118 of connector holder 110 is inserted through opening 184 until a pair of sides 186 of opening 184 engage ramped surfaces 180 of spring clips 122. Continued insertion of connector holder 110 will cause bulkhead sides 186 to deflect spring clips 122 inward toward sides 126. Bulkhead sides 186 will eventually pass beyond ends 178 of spring clips 122. Spring clips 122 will then spring back as shown in FIG. 48, capturing bulkhead sides 186 between ends 178 and flanges 124. Connector holder 110 may be removed from opening 184 by compressing spring clips 122 and removing in a direction opposite the insertion described above.

Alternatively, flanges 124 may be configured to include a fastener opening so that connector holder 110 can be mounted within opening 184 by removable fasteners.

It is anticipated that openings 184 for mounting adapters and connector holders may be included in sliding adapter packs, such as described in commonly-owned U.S. Pat. No. 5,497,444. The disclosure of this patent is incorporated herein by reference.

Referring now to FIGS. 49 through 52, dust cap 204 includes a central opening 208 to receive ferrule 202 when ferrule 202 is inserted through open end 210. Opposite open end 210 is closed end 212 which includes knurling 214 to provide better grip for removing dust cap 204. Central opening 208 fits about ferrule 202 to provide a seal about ferrule 202 and to hold dust cap to connector 200. Due to the reduction of air volume within central opening 208 when ferrule 202 is inserted (see FIG. 27), one or more helix shaped recesses 216 are provided within central opening 208 along inner walls 218. Recesses 216 extend from adjacent closed end 212 to open end 210. Recesses 216 are small enough prevent entry of unwanted contaminants and still permit air displaced within central opening 208 to be expelled when ferrule 202 is inserted so that dust cap 204 may be fully seat to connector 200. Recesses 216 also allow air to pass into central opening 208 when dust cap 204 is withdrawn from ferrule 202. The shape of each recess 216 is also designed to allow passage of air into and out of central opening 208 when dust cap 204 is removed or placed on ferrule 202 while inhibiting the passage of contaminants along the same path.

Referring now to FIGS. 5 through 8, cabinet 10 is shown without housing 12. A pair of vertical supports 51 and 52 adjacent sides 26 of housing 12 provide mounting locations for the equipment mounted in cabinet 10. A cable management panel 58 is mounted to vertical support 51, and a plurality of cable spools 30 are mounted to panel 58. Bend radius protectors 42 are mounted to each module housing 56 adjacent panel 58 and provide bend radius protection for cables 46 and 48 being directed from spools 30 to modules 36 or 37.

Mounted to the rear of fanout module 34 is a cable clamp 60 for securing the service cable after it enters cabinet 10 through opening 18 in bottom 20. From clamp 60, the service cable, sub-units of the service cable or smaller bundles of optical fibers may enter fanout module 34 through rear opening 62. In addition to spools 30 mounted to panel 58, another spool 30 is mounted to the front of fanout module 34 to provide bend radius protection and direct patch cords 46 and 48 from cable breakouts 54 into cable spools 30 of panel 58 and radius protectors 42 of modules 36 and 37.

Figure 9:
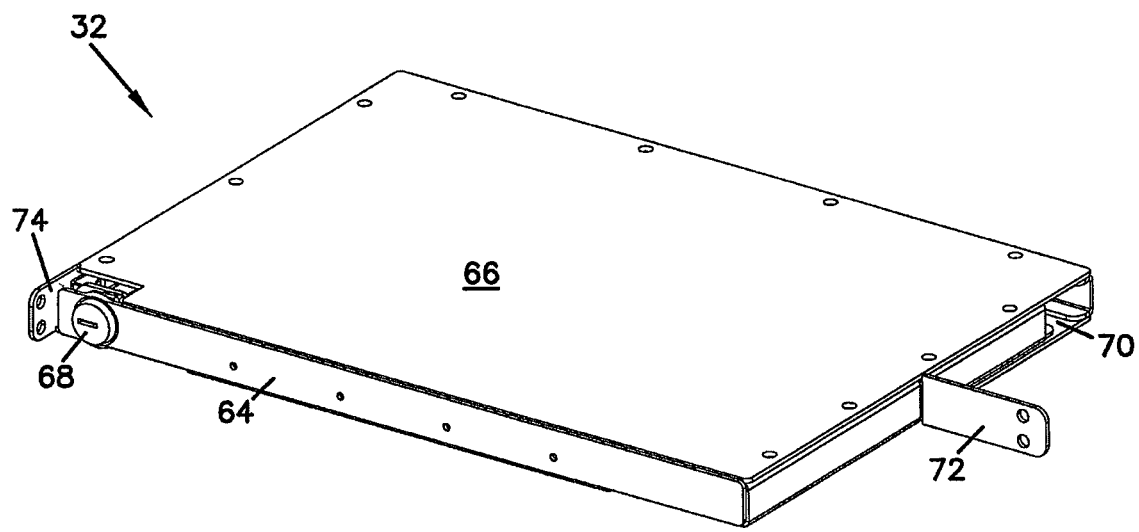
FIG. 9 is a front perspective view of a splice drawer module for use with telecommunications connection cabinet of FIG. 1.
Figure 10:
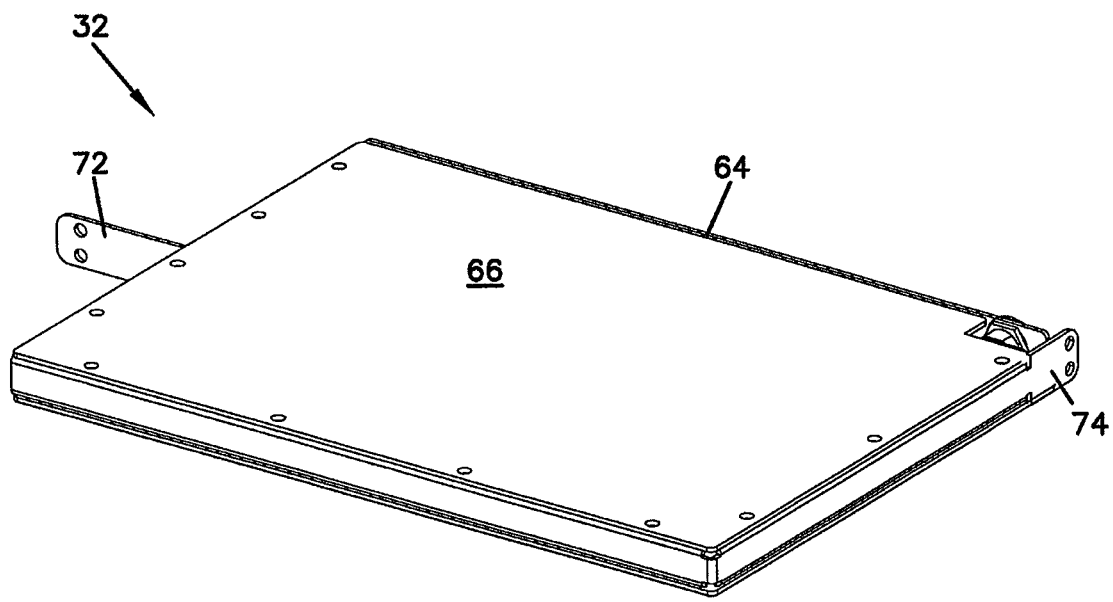
FIG. 10 is a rear perspective view of a splice drawer module for use with telecommunications connection cabinet of FIG. 1.

Referring now to FIGS. 9 and 10, splice module 32 includes a splice drawer 64 slidably mounted within a housing 66. Splice module housing 66 includes a pair of mounting flanges 72 and 74 for mounting splice module 32 to panel 58 and vertical support 52. A locking drawer latch 68 is included in drawer 64 to prevent unwanted or accidental access to the splices within splice module 32. A rear opening 70 is provided to permit cables from modules 36 to enter housing 66 and be spliced in drawer 64.

Figure 11:
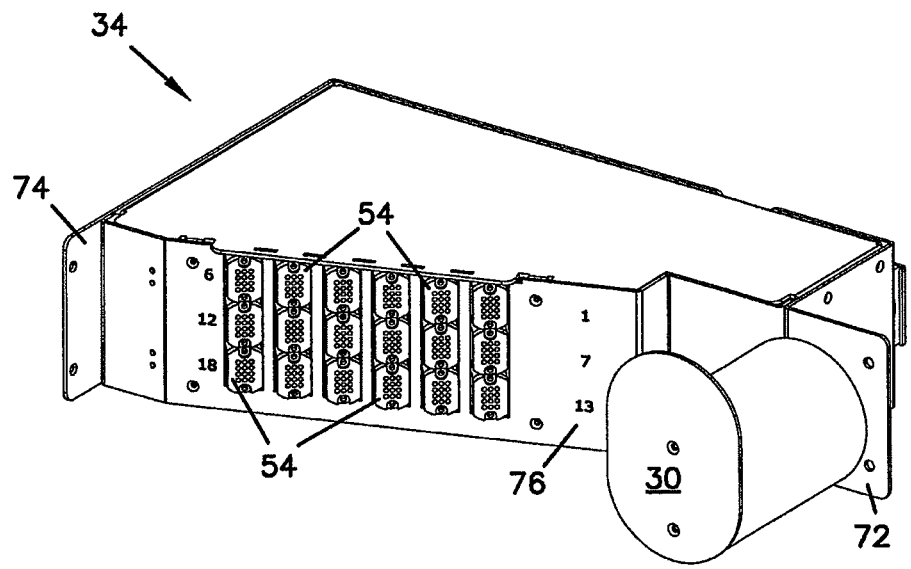
FIG. 11 is a front perspective view of a fanout module for use with telecommunications connection cabinet of FIG. 1.
Figure 12:
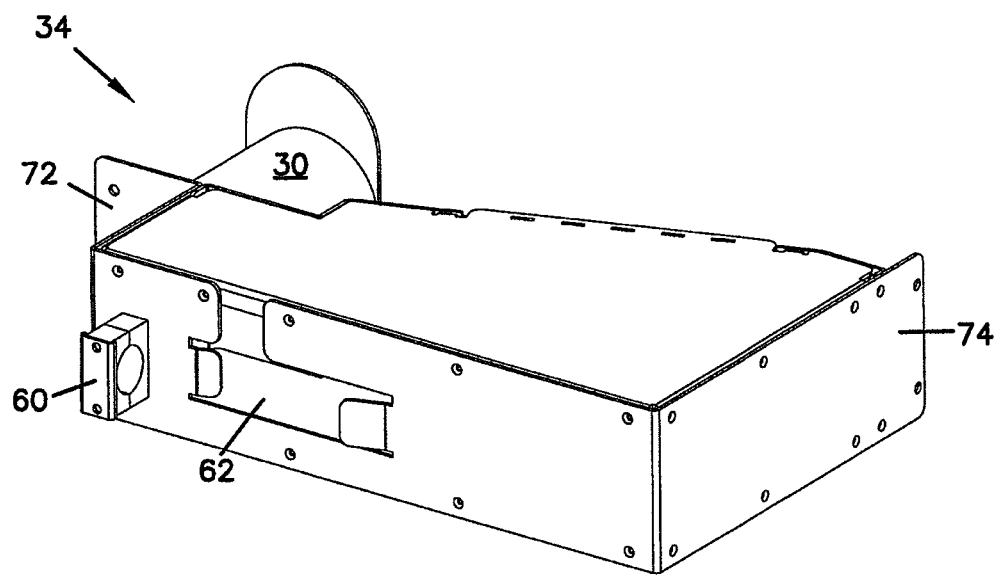
FIG. 12 is a rear perspective view of a fanout module for use with telecommunications connection cabinet of FIG. 1.

Referring now to FIGS. 11 and 12, fanout module 34 includes a front face to which are mounted the eighteen cable breakouts 54. Fanout module 34 also includes a flange 72 for mounting to panel 58 and a flange 74 for mounting to vertical support 52.

Figure 13:
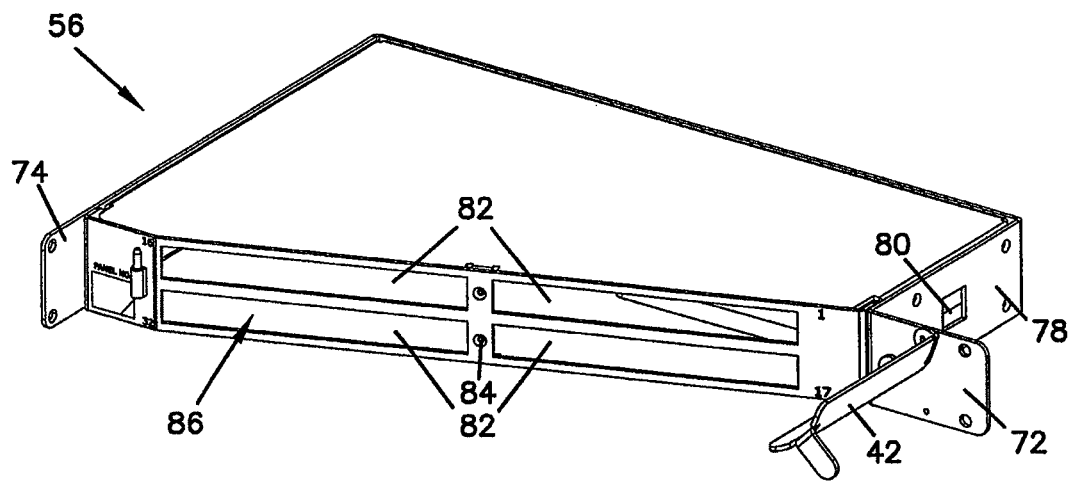
FIG. 13 is a front perspective view of a chassis for the splitter module or the adapter module of telecommunications connection cabinet of FIG. 1.
Figure 14:
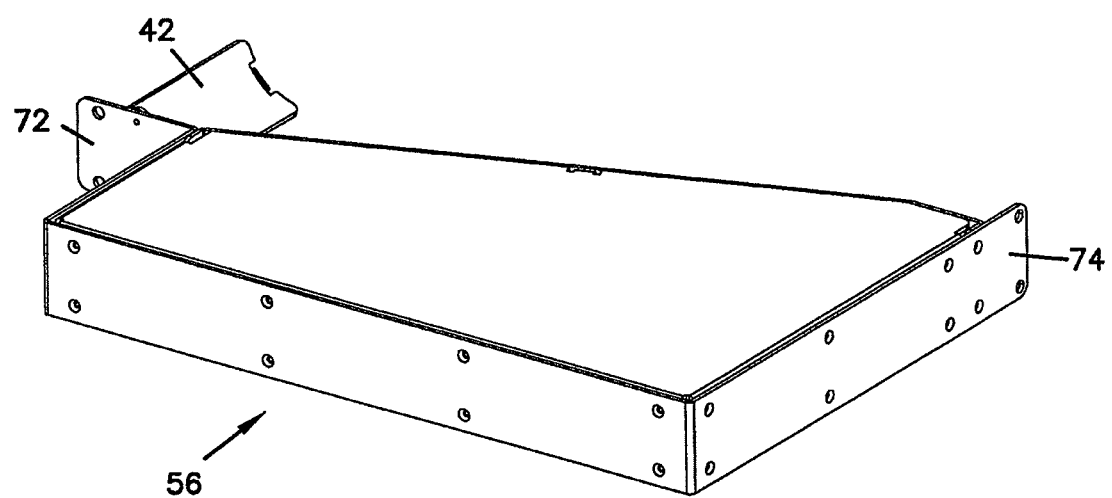
FIG. 14 is a rear perspective view of a chassis for the splitter module or the adapter module of telecommunications connection cabinet of FIG. 1.

Referring now to FIGS. 13 and 14, module housing 56 provides the basic shell for both adapter module 36 and connector holder module 37. Housing 56 includes a front face 84 with four openings 84. Openings 84 are sized and configured to receive up to eight adapters 50 or connector holders 110, so that a total of thirty-two patch cords 46 or 48 can be received. These adapters 50 or connector holders 110 may be held within opening 84 by a retainer clip such as that disclosed in commonly-owned U.S. Pat. No. 5,214,735, the disclosure of which is incorporated herein by reference. Module housing 56 also defines an interior space 86 with a cable exit 80 in a side wall 78. When module housing 56 is used for an adapter module 36, each adapter 50 mounted in openings 84 may have a connector 200 inserted into a rear side that will be optically linked with a connector 200 of patch cord 46 inserted into a front side. These rear connectors 200 may terminate fiber optic cables which may then extend through cable exit 80.

Alternatively, adapter module 36 may include a splitter within interior 86. Then, the connectors 200 attached to the rear of each adapter 50 would be optically connected to the splitter. The splitter would then combine the signals from each of the adapters 50 for a given module 36 into a single optical fiber cable which may then be directed out of module 36 through cable exit 80 and to rear opening 70 of splice module 32. Within splice module 32, each of the cables carrying the combined signals from the patch cords 46 connected to up to thirty-two adapters of a module 36 could be spliced into another cable for distribution of the signals to downstream equipment or customers.

As shown in the FIGS., cabinet 10 is configured for front access only, as no provision is made for an access opening through rear wall 23. Other configurations of housing 12 for cabinet 10 are contemplated, which may include providing additional access into interior 13. A preferred method of connecting a fiber optic service cable in cabinet 10 reduces the need access to the rear of the equipment mounted within housing 12.

To connect a service cable within cabinet 10, the service cable is fed into cabinet 10 through opening 18 in bottom 20. The service cable is directed into a space between the equipment mounted to vertical supports 51 and 52 and rear wall 23 and then clamped to the rear of fanout module 34 at clamp 60. From clamp 60, the cable may be broken out into sub-units and directed through opening 62 into an interior 61 of fanout module 34. Within interior 61, the sub-units of cable are further broken down to the individual fibers which are lead to cable breakouts 54 where they are passed out of interior 61 and preferably up jacketed to standard patch cords 46 or 48 terminated with connectors 200. Patch cords 46 and 48 are anticipated to standard size patch cords such as 1.7 mm, 2.0 mm, or otherwise appropriately sized for routing within cabinet 10.

From the breakouts 54, patch cords 46 and 48 are lead over spool 30 mounted to fanout module 34 and to the spools 30 mounted to panel 58. From these spools, the patch cords 46 and 48 are led past radius protectors 42 and connectors 200 inserted within an adapter 50 and a connector holder 110, respectively. Patch cords 46, as described above, are optically linked through adapter 50 and possibly a splitter within interior 86 of adapter module 36 to splice module 32 and then to downstream equipment. As described above, patch cords 48 are stored for future use in connector holders 110 with dust cap 104 in place to protect the polished end faces from damage or contamination.

When one of the stored or inactive patch cords 48 is needed for connection to downstream equipment, for instance when a new customer requests service or an existing customer needs to expand service, the desired inactive patch cord 48 is removed from connector holder 110. Dust cap 104 is removed from ferrule 102 of connector 200 and patch cord 48 is partially removed from spools 30 mounted to panel 58. This patch cord is then rerouted so that its connector 200 is adjacent the desired adapter 50 for connecting to downstream equipment. At this point, the former inactive patch cord 48 has become an active patch cord 46 and is inserted into the appropriate adapter 50. An active patch cord 46 may be converted to an inactive patch cord 48 by a reversal of the above process when a previously required circuit is no longer needed by a customer or other downstream equipment.

By configuring cabinet 10 as described above, only front access through access opening 16 is necessary in the field for a technician to connect a circuit for a new customer or an existing customer or to take a circuit out of service.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A telecommunications cabinet comprising:
   a cabinet housing including a cabinet top, a cabinet bottom, a cabinet front and a cabinet back, the cabinet housing further including a front door at the cabinet front that can be opened to provide front access to an interior of the cabinet housing;
   a panel within the interior of the cabinet housing, the panel having a front side and a rear side;
   a plurality of fiber optic adapter modules mounted one above another within a module mounting space defined within the interior of the cabinet housing, the fiber optic adapter modules each including a module housing having a module top, a module bottom, a module front, a module rear, and module sides that extend between the module top and the module bottom and also extend between the module front and the module rear, the module sides each facing in a lateral direction, the fiber optic adapter modules each including a least one horizontal row of fiber optic adapters mounted at the module front of each module housing, each fiber optic adapter module having a height defined between the module top and the module bottom that is sized to accommodate no more than two of the fiber optic adapters positioned one above another, the fiber optic adapters having front and rear ends configured for receiving fiber optic connectors;
   a plurality of optical fibers routed laterally into interior regions of the fiber optic adapter modules, the plurality of optical fibers being terminated by fiber optic connectors that are received within the rear ends of the fiber optic adapters;
   a fiber optic cord routing and management region within the interior of the cabinet housing that extends vertically between the cabinet top and the cabinet bottom, the fiber optic cord routing and management region being accessible from the front of the cabinet housing, the fiber optic cord routing and management region including a plurality of cable management structures that are positioned one above another and that are attached to the front side of the panel, the cable management structures including curved fiber bend limiting surfaces; and
   a fiber optic pigtail cord origination location within the interior of the cabinet housing, the fiber optic pigtail cord origination location being configured for mounting a fan-out module housing that is configured and sized differently from each of the module housings of the fiber optic adapter modules and is further configured for mounting cable break-outs.

2. The telecommunications cabinet of claim 1, wherein the fiber optic cord routing and management region includes first and second columns of cable management structures offset to one side of the fiber optic adapter modules.

3. The telecommunications cabinet of claim 1, wherein the fiber optic adapter modules include flanges for securing the fiber optic adapter modules within the module mounting space within the interior of the cabinet housing.

4. The telecommunication cabinet of claim 3, wherein at least one of the flanges of each of the fiber optic adapter modules attaches to the panel.

5. The telecommunication cabinet of claim 3, wherein the panel forms at least part of a component mounting frame within the interior of the cabinet housing, and wherein the fiber optic adapter modules mount directly to the component mounting frame.

6. The telecommunications cabinet of claim 5, wherein the component mounting frame divides the interior of the cabinet housing into a front portion and a rear portion, wherein the plurality of optical fibers are routed laterally into the interiors of the fiber optic adapter modules through side openings defined by the module sides of the fiber optic adapter modules, wherein the side openings are in the rear portion of the interior of the cabinet housing, and wherein the front ends of the fiber optic adapters are in the front portion of the interior of the cabinet housing.

7. The telecommunications cabinet of claim 1, wherein the cabinet housing includes first and second opposite cabinet sides that extend between the cabinet top and the cabinet bottom and that also extend between the cabinet front and the cabinet back, wherein the fiber optic cord routing and management region is positioned between the second cabinet side and the fiber optic adapter modules.

8. The telecommunications cabinet of claim 7, wherein the plurality of optical fibers are routed laterally through the module sides of the fiber optic adapter modules, and wherein the module sides through which the plurality of optical fibers extend face toward the second cabinet side.

9. The telecommunication cabinet of claim 1, wherein the panel forms at least part of a vertical panel structure within the interior of the cabinet housing, wherein the vertical panel structure defines the module mounting space and defines designated individual module mounting locations for mounting the fiber optic adapter modules to the vertical panel structure.

10. The telecommunications cabinet of claim 9, wherein the fiber optic adapter modules include flanges that are fastened to the vertical panel structure.

11. The telecommunications cabinet of claim 10, wherein the flanges of the fiber optic adapter modules define mounting openings that align with corresponding mounting openings defined by the vertical panel structure.

12. The telecommunications cabinet of claim 1, wherein the fiber optic adapter modules do not include optical splitters within the interior regions of the module housings.

13. The telecommunications cabinet of claim 8, further including a connector storage location located within the interior of the cabinet housing between the fiber optic cord routing and management region and the first cabinet side of the cabinet housing.

14. The telecommunications cabinet of claim 13, wherein the fiber optic pigtail cord origination location is positioned between the fiber optic cord routing and management region and the first cabinet side of the cabinet housing.

15. The telecommunications cabinet of claim 13, wherein the connector storage location is configured for receiving a connector storage module.

16. The telecommunications cabinet of claim 13, wherein the connector storage location is positioned higher in the cabinet housing than the fiber optic pigtail cord origination location.

17. The telecommunications cabinet of claim 13, wherein when a fiber optic connector is stored at the connector storage location, the fiber optic connector is unable to be co-axially connected to another fiber optic connector.

18. The telecommunications cabinet of claim 14, wherein the fiber optic pigtail origination location includes a fan-out module housing having designated locations for mounting cable breakouts.

19. The telecommunications cabinet of claim 7, wherein the fiber optic cord routing and management region extends along and is adjacent to the second cabinet side.

20. A telecommunications cabinet comprising:
a cabinet housing including a cabinet top, a cabinet bottom, a cabinet front and a cabinet back, the cabinet housing also including first and second opposite cabinet sides that extend between the cabinet top and the cabinet bottom and that also extend between the cabinet front and the cabinet back, the cabinet housing further including a front door at the cabinet front that can be opened to provide front access to an interior of the cabinet housing;
a panel within the interior of the cabinet housing, the panel having a front side and a rear side;
a plurality of fiber optic adapter modules mounted one above another within a module mounting space defined within the interior of the cabinet housing, the fiber optic adapter modules each including a module housing having a module top, a module bottom, a module front, a module rear, and module sides that extend between the module top and the module bottom and also extend between the module front and the module rear, the module sides facing in a lateral direction, the fiber optic adapter modules each including a least one horizontal row of fiber optic adapters mounted at the module front of each module housing, each fiber optic adapter module having a height defined between the module top and the module bottom that is sized to accommodate no more than two of the fiber optic adapters positioned one above another, the fiber optic adapters having front and rear ends configured for receiving fiber optic connectors;
a plurality of optical fibers routed laterally into interior regions of the fiber optic adapter modules, the plurality of optical fibers being terminated by fiber optic connectors that are received within the rear ends of the fiber optic adapters;
a fiber optic cord routing and management region within the interior of the cabinet housing that extends vertically between the cabinet top and the cabinet bottom, the fiber optic cord routing and management region being accessible from the front of the cabinet housing, the fiber optic cord routing and management region including a plurality of cable management structures that are positioned one above another and that are attached to the front side of the panel, the cable management structures including curved fiber bend limiting surfaces; and
a connector storage location and a fiber optic pigtail cord origination location positioned within the interior of the cabinet housing, the fiber optic pigtail cord origination location being configured for mounting a fan-out module housing that is sized and configured differently from each of the module housings of the fiber optic adapter modules and is further configured for mounting cable break-outs, wherein the connector storage location, the fiber optic pigtail cord origination location and the fiber optic adapter modules are all positioned on a first reference side of a vertical reference plane that extends in the front-to-back orientation through the cabinet housing, wherein the fiber optic cord routing and management region is positioned on an opposite second reference side of the vertical reference plane, wherein the connector storage location, the fiber optic pigtail cord origination location and the fiber optic adapter modules are all positioned between the vertical reference plane and the first cabinet side, and wherein the fiber optic cord routing and management region is positioned between the vertical reference plane and the second cabinet side.

21. The telecommunications cabinet of claim 20, wherein the connector storage location is configured for receiving a connector storage module.

22. The telecommunications cabinet of claim 21, wherein the connector storage location is positioned higher in the cabinet housing than the fiber optic pigtail cord origination location.

23. The telecommunications cabinet of claim 20, wherein when a fiber optic connector is stored at the connector storage location, the fiber optic connector is unable to be co-axially connected to another fiber optic connector.

24. The telecommunications cabinet of claim 20, comprising a fan-out module housing mounted at the fiber optic pigtail origination location, the fan-out module housing having designated locations for mounting cable-breakouts.

25. The telecommunications cabinet of claim 20, wherein the plurality of optical fibers are routed laterally into the interiors of the fiber optic adapter modules through side openings defined by the module sides of the fiber optic adapter modules.

26. A telecommunications cabinet comprising:
a cabinet housing including a cabinet top, a cabinet bottom, a cabinet front and a cabinet back, the cabinet housing also including first and second opposite cabinet sides that extend between the cabinet top and the cabinet bottom and that also extend between the cabinet front and the cabinet back, the cabinet housing further including a front door at the cabinet front that can be opened to provide front access to an interior of the cabinet housing;
a panel within the interior of the cabinet housing, the panel having a front side and a rear side;
a plurality of fiber optic adapter modules mounted one above another within a module mounting space defined within the interior of the cabinet housing, the fiber optic adapter modules each including a module housing having a module top, a module bottom, a module front, a module rear, and module sides that extend between the module top and the module bottom and also extend between the module front and the module rear, the module sides facing in a lateral direction, the fiber optic adapter modules each including a least one horizontal row of fiber optic adapters mounted at the module front of each module housing, each fiber optic adapter module having a height defined between the module top and the module bottom that is sized to accommodate no more than two of the fiber optic adapters positioned one above another, the fiber optic adapters having front and rear ends configured for receiving fiber optic connectors;
a plurality of optical fibers routed laterally into interior regions of the fiber optic adapter modules, the plurality of optical fibers being terminated by fiber optic connectors that are received within the rear ends of the fiber optic adapters;

a fiber optic cord routing and management region within the interior of the cabinet housing that extends vertically between the cabinet top and the cabinet bottom, the fiber optic cord routing and management region being accessible from the front of the cabinet housing, the fiber optic cord routing and management region including a plurality of cable management structures that are positioned one above another and that are attached to the front side of the panel, the cable management structures including curved fiber bend limiting surfaces;

a connector storage location and a component mounting location positioned within the interior of the cabinet housing, wherein the connector storage location, the component mounting location and the fiber optic adapter modules are all positioned on a first reference side of a vertical reference plane that extends in the front-to-back orientation through the cabinet housing, wherein the fiber optic cord routing and management region is positioned on an opposite second reference side of the vertical reference plane, wherein the connector storage location, the component mounting location and the fiber optic adapter modules are all positioned between the vertical reference plane and the first cabinet side, and wherein the fiber optic cord routing and management region is positioned between the vertical reference plane and the second cabinet side;

a connector storage module mounted at the connector storage location, the connector storage module including a plurality of connector storage ports accessible at a connector receiving side of the connector storage module, wherein when fiber optic connectors are stored within the connector storage module at the connector storage location, the fiber optic connectors are unable to be co-axially connected to other fiber optic connectors; and a fan-out module housing mounted at the component mounting location, the fan-out module housing being configured and sized differently from the module housings of the fiber optic adapter modules and mounting a cable breakout, the cable breakout including a plurality of fiber optic pigtail cords that extend from a cord output side of the cable breakout.

27. The telecommunications cabinet of claim 26, wherein the connector storage location is configured such when a fiber optic connector is stored within the connector storage module at the connector storage location, the fiber optic connector is oriented with a central axis of the fiber optic connector in a non-vertical orientation.

28. The telecommunications cabinet of claim 27, wherein the non-vertical orientation is horizontal.

29. The telecommunications cabinet of claim 26, wherein the connector storage module includes latches within the connector storage ports for retaining the fiber optic connectors within the connector storage ports.

30. The telecommunications cabinet of claim 26, wherein the connector storage ports are configured to receive fiber optic connectors having dust caps mounted over ferrules of the fiber optic connectors.

31. The telecommunications cabinet of claim 26, wherein the component mounting location is positioned lower in the cabinet housing than the connector storage location.

32. The telecommunications cabinet of claim 26, wherein the plurality of fiber optic pigtail cords includes a first fiber optic pigtail cord routed from the component mounting location, through the fiber optic cord routing and management region, and over to the fiber optic adapter modules where a connectorized end of the first fiber optic pigtail cord is plugged into one of the front ports of one of the fiber optic adapters, and wherein the plurality of fiber optic pigtail cords includes a second fiber optic pigtail cord routed from the component mounting location to the connector storage region where a connectorized end of the second fiber optic pigtail cord is plugged into one of the connector storage ports of the connector storage module.

33. The telecommunications cabinet of claim 26, wherein the plurality of optical fibers are routed laterally into the interiors of the fiber optic adapter modules through side openings defined by the module sides of the fiber optic adapter modules.

* * * * *